United States Patent
Kung et al.

(10) Patent No.: US 11,553,420 B2
(45) Date of Patent: Jan. 10, 2023

(54) METHOD AND APPARATUS FOR HANDLING CHANNEL STATE INFORMATION REPORTING REGARDING SIDELINK DISCONTINUOUS RECEPTION IN A WIRELESS COMMUNICATION SYSTEM

(71) Applicant: ASUSTek Computer Inc., Taipei (TW)

(72) Inventors: Yi-Hsuan Kung, Taipei (TW); Chun-Wei Huang, Taipei (TW); Ming-Che Li, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 17/153,446

(22) Filed: Jan. 20, 2021

(65) Prior Publication Data

US 2021/0227464 A1 Jul. 22, 2021

Related U.S. Application Data

(60) Provisional application No. 62/963,610, filed on Jan. 21, 2020.

(51) Int. Cl.
*H04W 52/02* (2009.01)

(52) U.S. Cl.
CPC ... *H04W 52/0216* (2013.01); *H04W 52/0229* (2013.01)

(58) Field of Classification Search
CPC ......... H04W 52/0216; H04W 52/0229; H04W 72/1278; H04W 72/1263; H04W 92/18; H04W 76/28; H04W 76/14; H04W 76/23; H04W 76/27; H04W 24/10; H04L 5/0057; H04B 7/0626; Y02D 30/70
See application file for complete search history.

(56) References Cited

U.S. PATENT DOCUMENTS

| | | | |
|---|---|---|---|
| 2019/0215897 A1 | 7/2019 | Babaei et al. | |
| 2019/0364590 A1 | 11/2019 | Sartori et al. | |
| 2020/0145867 A1* | 5/2020 | Tseng | H04B 7/0617 |
| 2021/0266769 A1* | 8/2021 | Chung | H04W 72/085 |

FOREIGN PATENT DOCUMENTS

| | | | | |
|---|---|---|---|---|
| WO | 2019197025 A1 | 10/2019 | | |
| WO | WO-2021030565 A1 * | 2/2021 | ....... | H04W 72/0406 |
| WO | WO-2022055254 A1 * | 3/2022 | | |

OTHER PUBLICATIONS

OOPP, "Left Issues on CSI Report for NR-V2X", 3GPP TSG-RAN WG2 Meting #108, R2-1914462, Agenda Item 6.4.2, Document for Discussion, Decision, Reno, US, Nov. 18-22, 2019.

(Continued)

*Primary Examiner* — Marcos L Torres
(74) *Attorney, Agent, or Firm* — Cooper Legal Group LLC

(57) ABSTRACT

A method and apparatus are disclosed. In an example from the perspective of a first device configured to discontinuously monitor one or more sidelink control channels, the first device performs a first sidelink transmission to a second device. In response to the first sidelink transmission, the first device starts or restarts a timer. The first device monitors a first sidelink control channel, from at least the second device, when the timer is running.

16 Claims, 14 Drawing Sheets

(56) References Cited

OTHER PUBLICATIONS

RAN2, "Response LS on TX Resource (re-)selection and MAC Related Agreements", 3GPP TSG-RAN WG2 Meeting #108, R2-1916460, Response to R1-1911746, Rel. Rel-16, Nov. 18-22, 2019, Reno, USA.

ASUSTek, "Discussion on MAC Impact Regarding Sidelink DRX", 3GPP TSG-RAN WG2 #113, R2-2103463, Agenda Item 8.15.2, Document for Discussion and Decision, Apr. 12-20, 2021, Online.

Corresponding European Patent Application No. 21152432.7, Extended European Search Report dated Jun. 2, 2021.

* cited by examiner

US 11,553,420 B2

METHOD AND APPARATUS FOR HANDLING CHANNEL STATE INFORMATION REPORTING REGARDING SIDELINK DISCONTINUOUS RECEPTION IN A WIRELESS COMMUNICATION SYSTEM

CROSS-REFERENCE TO RELATED APPLICATIONS

The present Application claims the benefit of U.S. Provisional Patent Application Ser. No. 62/963,610 filed on Jan. 21, 2020, the entire disclosure of which is incorporated herein in its entirety by reference.

FIELD

This disclosure generally relates to wireless communication networks, and more particularly, to a method and apparatus for handling Channel State Information reporting regarding sidelink discontinuous reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a first device configured to discontinuously monitor one or more sidelink control channels, the first device performs a first sidelink transmission to a second device. In response to the first sidelink transmission, the first device starts or restarts a timer. The first device monitors a first sidelink control channel, from at least the second device, when the timer is running.

In an example from the perspective of a first device configured to discontinuously monitor one or more sidelink control channels, the first device performs a first sidelink transmission to a second device, wherein the first sidelink transmission indicates a channel state information (CSI) report request. In response to the first sidelink transmission and/or the CSI report request, the first device stays in sidelink active time, for monitoring a first sidelink control channel from at least the second device, during a time interval of a CSI report availability time.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.321, V15.7.0, Medium Access Control (MAC) protocol specification; RP-193257 Work item for sidelink enhancement; Running CR to 38.321 for 5G V2X with NR sidelink; R1-1908917, "PHY layer procedures for NR sidelink", Ericsson. The standards and documents listed above are hereby expressly incorporated by reference in their entirety.

Figure 1:
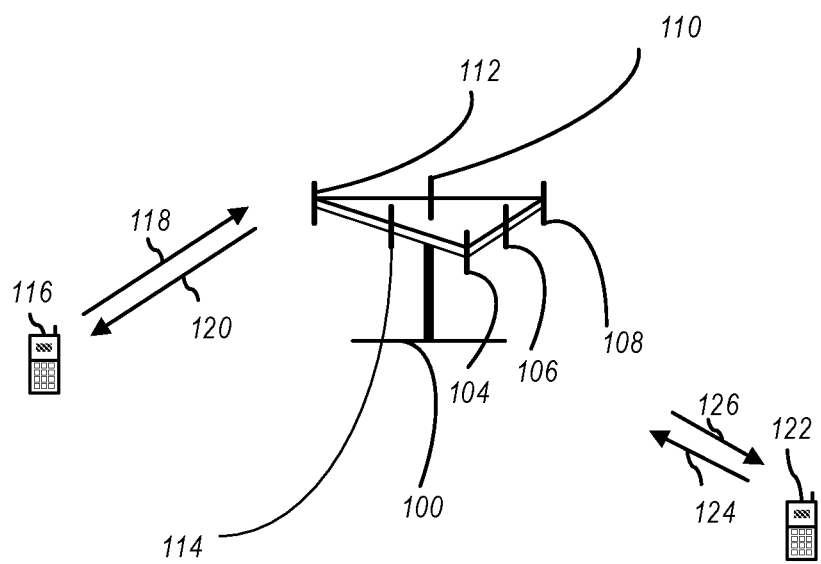
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
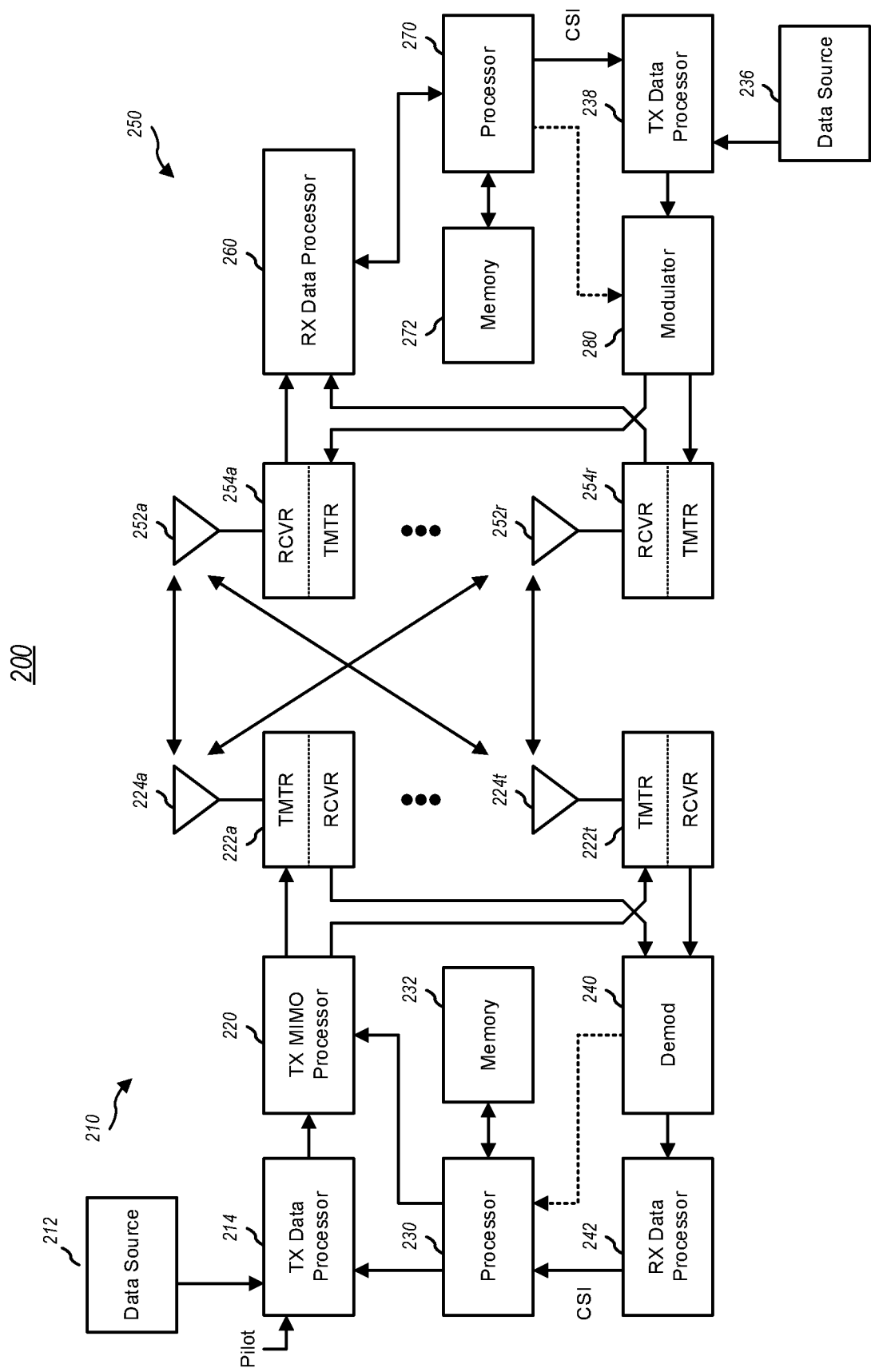
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
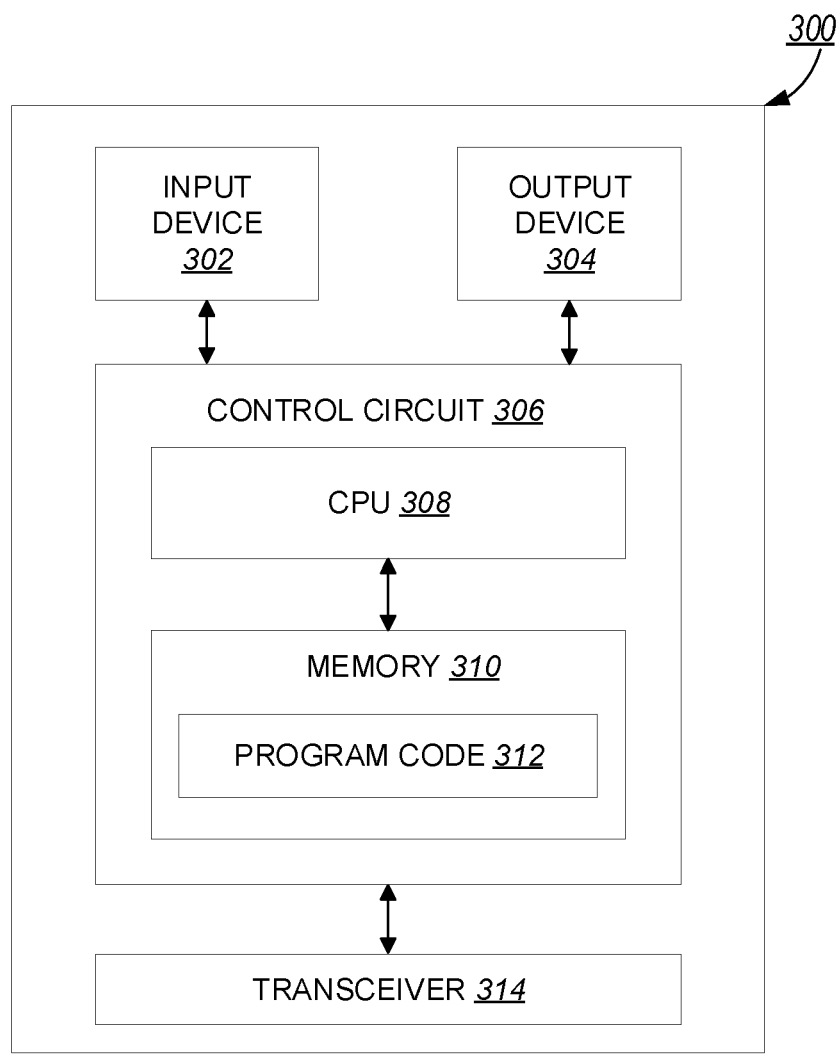
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
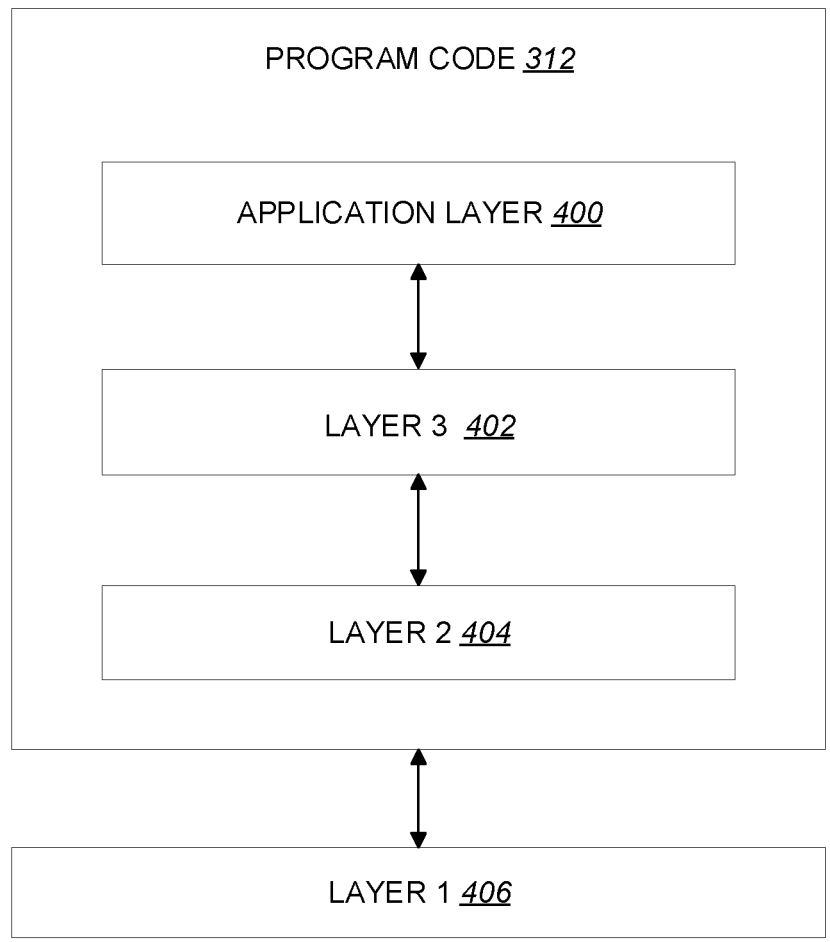
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In 3GPP TS 38.321, V15.7.0, Discontinuous Reception (DRX) is discussed:

5.7 Discontinuous Reception (DRX)

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

RRC controls DRX operation by configuring the following parameters:
- drx-onDurationTimer: the duration at the beginning of a DRX Cycle;
- drx-SlotOffset: the delay before starting the drx-onDurationTimer;
- drx-InactivityTimer: the duration after the PDCCH occasion in which a PDCCH indicates a new
- UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX Cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity.

When a DRX cycle is configured, the Active Time includes the time while:
- drx-onDurationTimer or drx-InactivityTimer or drx-RetransmissionTimerDL or drx-RetransmissionTimerUL or ra-ContentionResolutionTimer (as described in clause 5.1.5) is running; or
- a Scheduling Request is sent on PUCCH and is pending (as described in clause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

When DRX is configured, the MAC entity shall:
1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer;
  2> stop drx-InactivityTimer.
1> if drx-InactivityTimer expires or a DRX Command MAC CE is received:
  2> if the Short DRX cycle is configured:
    3> start or restart drx-ShortCycleTimer in the first symbol after the expiry of drx-InactivityTimer or in the first symbol after the end of DRX Command MAC CE reception;
    3> use the Short DRX Cycle.
  2> else:
    3> use the Long DRX cycle.
1> if drx-ShortCycleTimer expires:
  2> use the Long DRX cycle.
1> if a Long DRX Command MAC CE is received:
  2> stop drx-ShortCycleTimer;
  2> use the Long DRX cycle.
1> if the Short DRX Cycle is used, and [(SFN×10)+ subframe number] modulo (drx-ShortCycle)=(drx-StartOffset) modulo (drx-ShortCycle); or
1> if the Long DRX Cycle is used, and [(SFN×10)+ subframe number] modulo (drx-LongCycle)=drx-StartOffset:
  2> start drx-onDurationTimer after drx-SlotOffset from the beginning of the subframe.
1> if the MAC entity is in Active Time:
  2> monitor the PDCCH as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;

3>stop the drx-RetransmissionTimerDL for the corresponding HARQ process.
2>if the PDCCH indicates a UL transmission:
3>start the drx-HARQ-RTT-TimerUL for the corresponding HARQ process in the first symbol after the end of the first repetition of the corresponding PUSCH transmission;
3>stop the drx-RetransmissionTimerUL for the corresponding HARQ process.
2>if the PDCCH indicates a new transmission (DL or UL):
3>start or restart drx-InactivityTimer in the first symbol after the end of the PDCCH reception.
1>in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
2>not transmit periodic SRS and semi-persistent SRS defined in TS 38.214 [7];
2>not report CSI on PUCCH and semi-persistent CSI on PUSCH.
1>if CSI masking (csi-Mask) is setup by upper layers:
2>in current symbol n, if drx-onDurationTimer would not be running considering grants/assignments/DRX Command MAC CE/Long DRX Command MAC CE received until 4 ms prior to symbol n when evaluating all DRX Active Time conditions as specified in this clause:
3>not report CSI on PUCCH.

Regardless of whether the MAC entity is monitoring PDCCH or not, the MAC entity transmits HARQ feedback, aperiodic CSI on PUSCH, and aperiodic SRS defined in TS 38.214 [7] when such is expected.

The MAC entity needs not to monitor the PDCCH if it is not a complete PDCCH occasion (e.g. the Active Time starts or ends in the middle of a PDCCH occasion).

In RP-193257 Work item for sidelink enhancement, DRX for sidelink is discussed:
Objective
4.1 Objective of SI or Core Part WI or Testing Part WI
The objective of this work item is to specify radio solutions that can enhance NR sidelink for the V2X, public safety and commercial use cases.
1. Sidelink evaluation methodology update: Define evaluation assumption and performance metric for power saving by reusing TR 36.843 and/or TR 38.840 (to be completed by RAN #88) [RAN1]
  Note: TR 37.885 is reused for the other evaluation assumption and performance metric. Vehicle dropping model B and antenna option 2 shall be a more realistic baseline for highway and urban grid scenarios.
2. Resource allocation enhancement:
Specify resource allocation to reduce power consumption of the UEs [RAN1, RAN2]
  Baseline is to introduce the principle of Rel-14 LTE sidelink random resource selection and partial sensing to Rel-16 NR sidelink resource allocation mode 2.
  Note: Taking Rel-14 as the baseline does not preclude introducing a new solution to reduce power consumption for the cases where the baseline cannot work properly.
Study the feasibility and benefit of the enhancement(s) in mode 2 for enhanced reliability and reduced latency in consideration of both PRR and PIR defined in TR37.885 (by RAN #89), and specify the identified solution if deemed feasible and beneficial [RAN1, RAN2]
Inter-UE coordination with the following until RAN #88.
  A set of resources is determined at UE-A. This set is sent to UE-B in mode 2, and UE-B takes this into account in the resource selection for its own transmission.
  Note: The study scope after RAN #88 is to be decided in RAN #88.
  Note: The solution should be able to operate in-coverage, partial coverage, and out-of-coverage and to address consecutive packet loss in all coverage scenarios.
  Note: RAN2 work will start after RAN #89.
3. Sidelink DRX for broadcast, groupcast, and unicast [RAN2]
  Define on- and off-durations in sidelink and specify the corresponding UE procedure
  Specify mechanism aiming to align sidelink DRX wake-up time among the UEs communicating with each other
  Specify mechanism aiming to align sidelink DRX wake-up time with Uu DRX wake-up time in an in-coverage UE
4. Support of new sidelink frequency bands for single-carrier operations [RAN4]
  Support of new sidelink frequency bands should ensure coexistence between sidelink and Uu interface in the same and adjacent channels in licensed spectrum.
  The exact frequency bands are to be determined based on company input during the WI, considering both licensed and ITS-dedicated spectrum in both FR1 and FR2.
5. Define mechanism to ensure sidelink operation can be confined to a predetermined geographic area(s) for a given frequency range within non-ITS bands [RAN2].
  This applies areas where there is no network coverage.
6. UE Tx and Rx RF requirement for the new features introduced in this WI [RAN4]
7. UE RRM core requirement for the new features introduced in this WI [RAN4]

Enhancements introduced in Rel-17 should be based on the functionalities specified in Rel-16, and Rel-17 sidelink should be able to coexist with Rel-16 sidelink in the same resource pool. This does not preclude the possibility of operating Rel-17 sidelink in a dedicated resource pool.

The solutions should cover both the operating scenario where the carrier(s) is/are dedicated to ITS and the operating scenario where the carrier(s) is/are licensed spectrum and also used for NR Uu/LTE Uu operation.

The solutions should support the network control of NR sidelink as in Rel-16, i.e., NR Uu controls NR sidelink using Layer 1 and Layer 2 signalling and LTE Uu controls NR sidelink using Layer 2 signalling.

In ITS carriers, it is assumed that any co-channel coexistence requirements and mechanisms of NR sidelink with non-3GPP technologies will not be defined by 3GPP.

In Running CR to 38.321 for 5G V2X with NR sidelink, sidelink transmission is discussed:
5.x SL-SCH Data Transfer
5.x.1 SL-SCH Data Transmission
5.x.1.1 SL Grant Reception and SCI Transmission
Sidelink grant is received dynamically on the PDCCH, configured semi-persistently by RRC or autonomously selected by the MAC entity. The MAC entity shall have a sidelink grant on an active SL BWP to determine a set of PSSCH duration(s) in which transmission of SCI occurs and a set of PSSCH duration(s) in which transmission of SL-SCH associated with the SCI occurs.

If the MAC entity has a SL-RNTI or SLCS-RNTI, the MAC entity shall for each PDCCH occasion and for each grant received for this PDCCH occasion:
- 1>if a sidelink grant has been received on the PDCCH for the MAC entity's SL-RNTI:
  - 2>store the sidelink grant as configured sidelink grant;
  - 2>use the received sidelink grant to determine the set of PSCCH durations and the set of PSSCH durations for one or more (re-)transmissions of a single MAC PDU according to [38.2xx];
- 1>else if a sidelink grant has been received on the PDCCH for the MAC entity's SLCS-RNTI:
  - 2>if PDCCH contents indicate configured grant Type 2 deactivation for a configured sidelink grant:
    - 3>clear the configured sidelink grant, if available;
    - 3>trigger configured sidelink grant confirmation for the configured sidelink grant;
  - 2>else if PDCCH contents indicate configured grant Type 2 activation for a configured sidelink grant:
    - 3>trigger configured sidelink grant confirmation for the configured sidelink grant;
    - 3>store the configured sidelink grant;
    - 3>initialise or re-initialise the configured sidelink grant to determine the set of PSCCH durations and the set of PSSCH durations for transmissions of multiple MAC PDUs according to [xx].

Editor's Note: FFS whether SLCG-RNTI can be used for allocation of retransmission resource in RAN1.

If the MAC entity is configured by RRC to transmit using pool(s) of resources in a carrier as indicated in TS 38.331 [5] or TS 36.331 [xy] based on sensing, [or random selection], the MAC entity shall for each Sidelink process:
- 1>if the MAC entity selects to create a configured sidelink grant corresponding to transmissions of multiple MAC PDUs, and SL data is available in a logical channel:
  - 2>perform the TX resource (re-)selection check as specified in clause 5.x.1.2;
  - 2>if the TX resource (re-)selection is triggered as the result of the TX resource (re-)selection check;
    - 3>randomly select, with equal probability, an integer value in the interval [TBD] for the resource reservation interval in the interval [TBD] and set [SL_RESOURCE_RESELECTION_COUNTER] to the selected value;

Editor's Note: RAN2 assumes that SL_RESOURCE_RESELECTION_COUNTER is specified for Sidelink Mode 2 in 38.321 as in 36.321. This assumption needs to be confirmed by RAN1.

- 3>select the number of HARQ retransmissions from the allowed numbers that are configured by upper layers in [allowedRetxNumberPSSCH] included in [pssch-TxConfigList] and, if configured by upper layers, overlapped in [allowedRetxNumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;
- 3>select an amount of frequency resources within the range that is configured by upper layers between [minSubchannel-NumberPSSCH] and [naxSubchannel-NumberPSSCH] included in [pssch-TxConfigList] and, if configured by upper layers, overlapped between [minSubchannel-NumberPSSCH] and [naxSubchannel-NumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;
- 3>randomly select the time and frequency resources for one transmission opportunity from the resources indicated by the physical layer according to TS 36.2xx [xx], according to the amount of selected frequency resources.
- 3>use the randomly selected resource to select a set of periodic resources spaced by the resource reservation interval for transmissions of PSCCH and PSSCH corresponding to the number of transmission opportunities of MAC PDUs determined in TS 38.2xx [xx];
- 3>if one or more HARQ retransmissions are selected:
  - 4>if there are available resources left in the resources indicated by the physical layer according to TS 38.2xx [xx] for more transmission opportunities:
    - 5>randomly select the time and frequency resources for one or more transmission opportunities from the available resources, according to the amount of selected frequency resources and the selected number of HARQ retransmissions;
    - 5>use the randomly selected resource to select a set of periodic resources spaced by the resource reservation interval for transmissions of PSCCH and PSSCH corresponding to the number of retransmission opportunities of the MAC PDUs determined in TS 38.2xx [xx];
    - 5>[consider the first set of transmission opportunities as the new transmission opportunities and the other set of transmission opportunities as the retransmission opportunities;]

Editor's Note: FFS how retransmission opportunities are determined.

- 5>consider the set of new transmission opportunities and retransmission opportunities as the selected sidelink grant.
  - 3>else:
    - 4>consider the set as the selected sidelink grant;
  - 3>use the selected sidelink grant to determine the set of PSCCH durations and the set of PSSCH durations according to TS 38.2xx [xx];
  - 3>consider the selected sidelink grant to be a configured sidelink grant.
- 1>if the MAC entity selects to create a configured sidelink grant corresponding to transmission(s) of a single MAC PDU, and SL data is available in a logical channel:
  - 2>perform the TX resource (re-)selection check as specified in clause 5.x.1.2;
  - 2>if the TX resource (re-)selection is triggered as the result of the TX resource (re-)selection check;
    - 3>select the number of HARQ retransmissions from the allowed numbers that are configured by upper layers in [allowedRetxNumberPSSCH] included in [pssch-TxConfigList] and, if configured by upper layers, overlapped in [allowedRetxNumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;

3>select an amount of frequency resources within the range that is configured by upper layers between [minSubchannel-NumberPSSCH] and [maxSubchannel-NumberPSSCH] included in [pssch-TxConfigList] and, if configured by upper layers, overlapped between [minSubchannel-NumberPSSCH] and [maxSubchannel-NumberPSSCH] indicated in [cbr-pssch-TxConfigList] for the highest priority of the sidelink logical channel(s) allowed on the selected carrier and the CBR measured by lower layers according to TS 38.2xx [xx] if CBR measurement results are available or the corresponding [defaultTxConfigIndex] configured by upper layers if CBR measurement results are not available;

3>randomly select the time and frequency resources for one transmission opportunity from the resources indicated by the physical layer according to TS 38.2xx [xx], according to the amount of selected frequency resources.

3>if one or more HARQ retransmissions are selected:
    4>if there are available resources left in the resources indicated by the physical layer according to TS 38.2xx [xx] for more transmission opportunities:
        5>randomly select the time and frequency resources for one or more transmission opportunities from the available resources, according to the amount of selected frequency resources and the selected number of HARQ retransmissions;
        5>[consider a transmission opportunity which comes first in time as the new transmission opportunity and a transmission opportunity which comes later in time as the retransmission opportunity];
        5>consider both of the transmission opportunities as the selected sidelink grant;

3>else:
    4>consider the set as the selected sidelink grant;

3>use the selected sidelink grant to determine PSCCH duration(s) and PSSCH duration(s) according to TS 38.2xx [xx];

3>consider the selected sidelink grant to be a configured sidelink grant.

The MAC entity shall for each PSSCH duration:

1>for each configured sidelink grant occurring in this PSSCH duration:
    2>deliver the sidelink grant to the Sidelink HARQ Entity for this PSSCH duration.

5.x.1.2 TX Resource (Re-)Selection Check

If the TX resource (re-)selection check procedure is triggered for a Sidelink process according to clause 5.x.1.1, the MAC entity shall for the Sidelink process:

1>if [SL_RESOURCE_RESELECTION_COUNTER= 0]; or

Editor's Note: FFS on need of additional condition triggering TX resource (re-)selection.

1>if a pool of resources is configured or reconfigured by upper layers; or
1>if there is no configured sidelink grant; or
1>if the configured sidelink grant cannot accommodate a RLC SDU [by using the maximum allowed MCS configured by upper layers in maxMCS-PSSCH] and the MAC entity selects not to segment the RLC SDU; or NOTE: If the configured sidelink grant cannot accommodate the RLC SDU, it is left for UE implementation whether to perform segmentation or sidelink resource reselection.

1>if transmission(s) with the configured sidelink grant cannot fulfil the latency requirement of the data in a logical channel according to the associated priority, and the MAC entity selects not to perform transmission(s) corresponding to a single MAC PDU; or NOTE: If the latency requirement is not met, it is left for UE implementation whether to perform transmission(s) corresponding to single MAC PDU or sidelink resource reselection.

1>if a sidelink transmission is scheduled by any received SCI indicating a higher priority than the priority of the logical channel and expected to overlap with a resource of the configured sidelink grant, and a measured result on SL-RSRP associated with the sidelink transmission is higher than [threshold]:
    2>clear the configured sidelink grant associated to the Sidelink process, if available;
    2>trigger the TX resource (re-)selection.

5.x.1.3 Sidelink HARQ Operation 5.x.1.3.1 Sidelink HARQ Entity

The MAC entity includes at most one Sidelink HARQ entity for transmission on SL-SCH, which maintains a number of parallel Sidelink processes.

The maximum number of transmitting Sidelink processes associated with the Sidelink HARQ Entity is [TBD1]. A sidelink process may be configured for transmissions of multiple MAC PDUs. For transmissions of multiple MAC PDUs, the maximum number of transmitting Sidelink processes associated with the Sidelink HARQ Entity is [TBD2].

Editor's Note: For transmissions of multiple MAC PDUs, TBD2 value is smaller than TBD1 value.

A delivered sidelink grant and its associated HARQ information are associated with a Sidelink process. Each Sidelink process supports one TB.

Editor's Note: FFS on need of specifying how HARQ information is generated, if currently missing in this CR.

For each sidelink grant, the Sidelink HARQ Entity shall:

Editor's Note: FFS whether a sidelink grant is used for initial transmission or retransmission is up to UE implementation for SL mode 2 and dynamic grant in RAN1.

1>if the MAC entity determines that the the sidelink grant is used for initial transmission, and if no MAC PDU has been obtained:

NOTE: For the configured grant Type 1 and 2, whether a sidelink grant is used for initial transmission or retransmission is up to UE implementation.

Editor's Note: RAN1 agreed that UE decides which TB to transmit in each of the occasions indicated by a given configured grant. RAN2 can revisit if the above NOTE is not aligned with the RAN1 agreement.

2>associate a Sidelink process to this grant, and for each associated Sidelink process:

3>obtain the MAC PDU to transmit from the Multiplexing and assembly entity, if any;
3>if a MAC PDU to transmit has been obtained:
4>deliver the MAC PDU, the sidelink grant and the HARQ information and the QoS information of the TB to the associated Sidelink process;
4>instruct the associated Sidelink process to trigger a new transmission;
3>else:
4>flush the HARQ buffer of the associated Sidelink process.
1>else (i.e. retransmission):
2>identify the Sidelink process associated with this grant, and for each associated Sidelink process:
3>if a positive acknowledgement to a transmission of the MAC PDU has been received according to clause 5.x.1.3.3; or
3>if only a negative acknowledgement is configured and no negative acknowledgement is for the the most recent (re-)transmission of the MAC PDU according to clause 5.x.1.3.3:
4>clear the sidelink grant;
4>flush the HARQ buffer of the associated Sidelink process;
3>else:
Editor's Note: FFS on need of checking additional conditions to trigger a HARQ retransmission e.g. based on the maximum number of retransmissions.
4>deliver the sidelink grant and HARQ information and QoS information of the MAC PDU to the associated Sidelink process;
4>instruct the associated Sidelink process to trigger a retransmission.

5.x.1.3.2 Sidelink process

The Sidelink process is associated with a HARQ buffer.

New transmissions and retransmissions are performed on the resource indicated in the sidelink grant as specified in clause 5.x.1.1 and with the MCS selected as specified in [clause 5.x.1.1].

If the sidelink process is configured to perform transmissions of multiple MAC PDUs the process maintains [a counter SL_RESOURCE_RESELECTION_COUNTER]. For other configurations of the sidelink process, this counter is not available.

If the Sidelink HARQ Entity requests a new transmission, the Sidelink process shall:
1>consider the NDI to have been toggled for the Sidelink process;
1>store the MAC PDU in the associated HARQ buffer;
1>associate the Sidelink process to a HARQ Process ID for the Source Layer-2 ID and Destination Layer-2 ID pair of the MAC PDU for one of unicast, groupcast and [broadcast] which is associated to the pair;
NOTE: How UE determine HARQ process ID is left to UE implementation for NR sidelink
1>store the sidelink grant received from the Sidelink HARQ Entity;
1>generate a transmission as described below;
If the Sidelink HARQ Entity requests a retransmission, the Sidelink process shall:
1>consider the NDI not to have been toggled for the Sidelink process;
1>generate a transmission as described below;

To generate a transmission, the Sidelink process shall:
1>if there is no uplink transmission; or
1>if the MAC entity is able to simultaneously perform uplink transmission(s) and sidelink transmission at the time of the transmission; or
1>if the other MAC entity and the MAC entity are able to simultaneously perform uplink transmission(s) and sidelink transmission at the time of the transmission respectively; or
Editor's Note: In the above text, the other MAC entity corresponds to at least E-UTRA MAC entity performing the uplink transmission(s) in (NG)EN-DC. FFS on support of the other cases.
1>if there is a MAC PDU to be transmitted for this duration in uplink, except a MAC PDU obtained from the Msg3 buffer or having logical channel(s) of which the value of the highest priority is lower than [thresUL-TxPrioritization], if configured, and the sidelink transmission is prioritized over uplink transmission:
2>instruct the physical layer to transmit SCI according to the stored sidelink grant with the associated HARQ information including the values of the NDI and the HARQ Process ID and the associated QoS information including the value of the highest priority of the logical channel(s) in the MAC PDU;
NOTE: The initial value of the NDI set to the very first transmission for the Sidelink HARQ Entity is left to UE implementation.
2>instruct the physical layer to generate a transmission according to the stored sidelink grant;
2>if HARQ feedback is configured for a logical channel from which a MAC SDU is included in the MAC PDU:
3>instructs the physical layer to monitor PSFCH for the transmission as specified in TS 38.2xx [x].
1>if this transmission corresponds to the last transmission of the MAC PDU:
2>decrement [SL_RESOURCE_RESELECTION_COUNTER] by 1, if available.

The transmission of the MAC PDU is prioritized over uplink transmissions of the MAC entity or the other MAC entity if the following conditions are met:
1>if the MAC entity is not able to perform this sidelink transmission simultaneously with all uplink transmissions at the time of the transmission, and
1>if uplink transmission is not prioritized by upper layer according to TS [24.386] [xx]; and
1>if the value of the highest priority of the logical channel(s) in the MAC PDU is lower than [thresSL-TxPrioritization] if [thresSL-TxPrioritization] is configured.

5.x.1.3.3 PSFCH Reception

The MAC entity shall for each PSSCH transmission:
1>if an acknowledgement corresponding to the transmission in clause 5.x.1.3.2 is obtained from the physical layer:
2>deliver the acknowledgement to the corresponding Sidelink HARQ entity for the Sidelink process;
1>else:
2>deliver a negative acknowledgement to the corresponding Sidelink HARQ entity for the Sidelink process;
1>if the MAC entity has a SL-RNTI or SLCS-RNTI and a valid PUCCH resource configured for [sidelink acknowledgement]:
2>instruct the physical layer to signal the PUCCH according to TS 38.2xx [x].

Editor's Note: FFS whether instructing the L1 to signal the PUCCH is to be specified in 38.321 or RAN1 specification.

5.x.1.4 Multiplexing and Assembly

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

5.x.1.4.1 Logical Channel Prioritization 5.x.1.4.1.1 General

The sidelink Logical Channel Prioritization procedure is applied whenever a new transmission is performed.

RRC controls the scheduling of sidelink data by signalling for each logical channel:
- [sl-priority] where an increasing priority value indicates a lower priority level;
- [sl-prioritisedBitRate] which sets the sidelink Prioritized Bit Rate (sPBR);
- [sl-bucketSizeDuration] which sets the sidelink Bucket Size Duration (sBSD).

RRC additionally controls the LCP procedure by configuring mapping restrictions for each logical channel:
- [configuredSLGrantType1Allowed] which sets whether a configured grant Type 1 can be used for sidelink transmission.

The following UE variable is used for the Logical channel prioritization procedure:
- [SBj] which is maintained for each logical channel j.

The MAC entity shall initialize [SBj] of the logical channel to zero when the logical channel is established.

For each logical channel j, the MAC entity shall:
1> increment [SBj] by the product sPBR×T before every instance of the LCP procedure, where T is the time elapsed since [SBj] was last incremented;
1> if the value of [SBj] is greater than the sidelink bucket size (i.e. sPBR×sBSD):
   2> set [SBj] to the sidelink bucket size.

NOTE: The exact moment(s) when the UE updates [SBj] between LCP procedures is up to UE implementation, as long as [SBj] is up to date at the time when a grant is processed by LCP.

5.x.1.4.1.2 Selection of Logical Channels

The MAC entity shall for each SCI corresponding to a new transmission:
1> select a Destination associated to one of unicast, groupcast and broadcast, having the logical channel with the highest priority, among the logical channels having data available for transmission;
1> select the logical channels for each SL grant that satisfy all the following condition:
   2> [configuredSLGrantType1Allowed], if configured, is set to true in case the SL grant is a Configured Grant Type 1.

5.x.1.4.1.3 Allocation of Sidelink Resources

The MAC entity shall for each SCI corresponding to a new transmission:
1> allocate resources to the logical channels as follows:
   2> logical channels selected in clause 5.x.1.4.1.2 for the SL grant with [SBj]>0 are allocated resources in a decreasing priority order. If the SL-PBR of a logical channel is set to infinity, the MAC entity shall allocate resources for all the data that is available for transmission on the logical channel before meeting the sPBR of the lower priority logical channel(s);
   2> decrement [SBj] by the total size of MAC SDUs served to logical channel j above;
   2> if any resources remain, all the logical channels selected in clause 5.x.1.4.1.2 are served in a strict decreasing priority order (regardless of the value of [SBj]) until either the data for that logical channel or the SL grant is exhausted, whichever comes first. Logical channels configured with equal priority should be served equally.

NOTE: The value of [SBj] can be negative.

The UE shall also follow the rules below during the SL scheduling procedures above:
- the UE should not segment an RLC SDU (or partially transmitted SDU or retransmitted RLC PDU) if the whole SDU (or partially transmitted SDU or retransmitted RLC PDU) fits into the remaining resources of the associated MAC entity;
- if the UE segments an RLC SDU from the logical channel, it shall maximize the size of the segment to fill the grant of the associated MAC entity as much as possible;
- the UE should maximise the transmission of data;
- if the MAC entity is given a sidelink grant size that is equal to or larger than [x] bytes while having data available and allowed (according to clause 5.x.1.4.1) for transmission, the MAC entity shall not transmit only padding;
- [A logical channel with HARQ-enabled and a logical channel with HARQ-disabled cannot be multiplexed into the same MAC PDU.]

Editor's Note: FFS how LCP will take HARQ A/N enabled/disabled into account, e.g. packet with HARQ enabled will be multiplexed only with packets with HARQ enabled.

The MAC entity shall not generate a MAC PDU for the HARQ entity if the following conditions are satisfied:
the MAC PDU includes zero MAC SDUs.

Logical channels shall be prioritised in accordance with the following order (highest priority listed first):
data from SCCH;

Editor's Note: FFS on whether different SCCHs have different priorities i.e. for PC5-S and PC5-RRC.

[FFS on need of MAC CE for SL-CSI/RI];
data from any STCH.

5.x.1.3.2 Multiplexing of MAC SDUs

The MAC entity shall multiplex MAC SDUs in a MAC PDU according to clauses 5.x.1.3.1 and 6.x.

5.x.1.5 Scheduling Request

In addition to clause 5.4.4, the Scheduling Request (SR) is also used for requesting SL-SCH resources for new transmission. If configured, the MAC entity performs the SR procedure as specified in this clause unless otherwise specified in clause 5.4.4.

The SR configuration of the logical channel that triggered the Sidelink BSR (clause 5.x.1.6) (if such a configuration exists) is also considered as corresponding SR configuration for the triggered SR (clause 5.4.4).

All pending SR(s) triggered according to the Sidelink BSR procedure (clause 5.x.1.6) prior to the MAC PDU assembly shall be cancelled and each respective sr-ProhibitTimer shall be stopped when the MAC PDU is transmitted and this PDU includes a Sidelink BSR MAC CE which contains buffer status up to (and including) the last event that triggered a Sidelink BSR (see clause 5.x.1.4) prior to the MAC PDU assembly. All pending SR(s) triggered for requesting SL-SCH resources shall be cancelled and each respective sr-ProhibitTimer shall be stopped when the SL grant(s) can accommodate all pending data available for transmission in sidelink.

5.x.1.6 Buffer Status Reporting

The Sidelink Buffer Status reporting (SL-BSR) procedure is used to provide the serving gNB with information about SL data volume in the MAC entity.

RRC configures the following parameters to control the SL-BSR:
  periodicBSR-TimerSL;
  retxBSR-TimerSL;
  logicalChannelSR-DelayTimerAppliedSL;
  logicalChannelSR-DelayTimerSL;
  logicalChannelGroupSL.

Each logical channel which belongs to a Destination is allocated to an LCG as specified in TS 38.331 [5] or TS 36.331 [xy]. The maximum number of LCGs is eight.

The MAC entity determines the amount of SL data available for a logical channel according to the data volume calculation procedure in TSs 38.322 [3] and 38.323 [4].

A SL-BSR shall be triggered if any of the following events occur:
1>if the MAC entity has a [SL-RNTI] or [SLCS-RNTI]:
  2>SL data, for a logical channel of a Destination, becomes available to the MAC entity; and either
    3>this SL data belongs to a logical channel with higher priority than the priorities of the logical channels containing available SL data which belong to any LCG belonging to the same Destination; or
    3>none of the logical channels which belong to an LCG belonging to the same Destination contains any available SL data.
  in which case the SL-BSR is referred below to as 'Regular SL-BSR';
  2>UL resources are allocated and number of padding bits remaining after a Padding BSR has been triggered is equal to or larger than the size of the SL-BSR MAC CE plus its subheader, in which case the SL-BSR is referred below to as 'Padding SL-BSR';
  2>retxBSR-TimerSL expires, and at least one of the logical channels which belong to an LCG contains SL data, in which case the SL-BSR is referred below to as 'Regular SL-BSR';
  2>periodicBSR-TimerSL expires, in which case the SL-BSR is referred below to as 'Periodic SL-BSR'.
1>else:
  2>An SL-RNTI is configured by RRC and SL data is available for transmission in the RLC entity or in the PDCP entity, in which case the Sidelink BSR is referred below to as "Regular Sidelink BSR".

For Regular SL-BSR, the MAC entity shall:
1>if the SL-BSR is triggered for a logical channel for which logicalChannelSR-DelayTimerAppliedSL with value true is configured by upper layers:
  2>start or restart the logicalChannelSR-DelayTimerSL.
1>else:
  2>if running, stop the logicalChannelSR-DelayTimerSL.

For Regular and Periodic SL-BSR, the MAC entity shall:
1>if [thresSL-TxPrioritization] is configured and the value of the highest priority of the logical channels that belong to any LCG and contain SL data for any Destination is lower than [thresSL-TxPrioritization]; and 1>if either [thresUL-TxPrioritization] is not configured or [thresUL-TxPrioritization] is configured and the value of the highest priority of the logical channels that belong to any LCG and contain UL data is equal to or higher than [thresUL-TxPrioritization] according to clause 5.4.5:
  2>prioritize the LCG(s) for the Destination(s).
1>if the number of bits in the UL grant is expected to be equal to or larger than the size of a SL-BSR containing buffer status for all LCGs having data available for transmission plus its subheader according to clause 5.4.3.1.3:
  2>report SL-BSR containing buffer status for all LCGs having data available for transmission;
1>else:
  2>if the number of bits in the UL grant is expected to be smaller than the size of a SL-BSR containing buffer status only for all prioritized LCGs having data available for transmission plus its subheader according to clause 5.4.3.1.3:

Editor's Note: The above condition may need to be further improved if it is concluded that the text does not correctly capture the corresponding agreement.

3>report Truncated SL-BSR containing buffer status for as many LCGs having data available for transmission as possible, taking the number of bits in the UL grant into consideration;
    3>prioritize the SL-BSR for logical channel prioritization specified in clause 5.4.3.1;

Editor's Note: FFS on whether the SL-BSR can contain non-prioritied LCG as well as prioritized LCG.

2>else:
    3>report Truncated SL-BSR containing buffer status for as many LCGs having data available for transmission as possible, taking the number of bits in the UL grant into consideration.

For Padding BSR:
1>if the number of padding bits remaining after a Padding BSR has been triggered is equal to or larger than the size of a SL-BSR containing buffer status for all LCGs having data available for transmission plus its subheader:
  2>report SL-BSR containing buffer status for all LCGs having data available for transmission;
1>else:
  2>report Truncated SL-BSR containing buffer status for as many LCGs having data available for transmission as possible, taking the number of bits in the UL grant into consideration.

For SL-BSR triggered by retxBSR-TimerSL expiry, the MAC entity considers that the logical channel that triggered the SL-BSR is the highest priority logical channel that has data available for transmission at the time the SL-BSR is triggered.

The MAC entity shall:
1>if the sidelink Buffer Status reporting procedure determines that at least one SL-BSR has been triggered and not cancelled:
  2>if UL-SCH resources are available for a new transmission and the UL-SCH resources can accommodate the SL-BSR MAC CE plus its subheader as a result of logical channel prioritization according to clause 5.4.3.1:
    3>instruct the Multiplexing and Assembly procedure in clause 5.4.3 to generate the SL-BSR MAC CE(s);

3>start or restart periodicBSR-TimerSL except when all the generated SL-BSRs are Truncated SL-BSRs;
3>start or restart retxBSR-TimerSL.
2>if a Regular SL-BSR has been triggered and logicalChannelSR-DelayTimerSL is not running:
3>if there is no UL-SCH resource available for a new transmission; or
3>if the MAC entity is configured with configured uplink grant(s):
4>trigger a Scheduling Request.

NOTE: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one SL-BSR MAC CE, even when multiple events have triggered a SL-BSR. The Regular SL-BSR and the Periodic SL-BSR shall have precedence over the padding SL-BSR.

The MAC entity shall restart retxBSR-TimerSL upon reception of an SL grant for transmission of new data on any SL-SCH.

All triggered SL-BSRs may be cancelled when the SL grant(s) can accommodate all pending data available for transmission. All BSRs triggered prior to MAC PDU assembly shall be cancelled when a MAC PDU is transmitted and this PDU includes a SL-BSR MAC CE which contains buffer status up to (and including) the last event that triggered a SL-BSR prior to the MAC PDU assembly. All triggered SL-BSRs shall be cancelled, and retx-BSR-TimerSL and periodic-BSR-TimerSL shall be stopped, when upper layers configure autonomous resource selection.

NOTE: MAC PDU assembly can happen at any point in time between uplink grant reception and actual transmission of the corresponding MAC PDU. SL-BSR and SR can be triggered after the assembly of a MAC PDU which contains a SL-BSR MAC CE, but before the transmission of this MAC PDU. In addition, SL-BSR and SR can be triggered during MAC PDU assembly.

5.x.2 SL-SCH Data Reception
5.x.2.1 SCI Reception

SCI indicate if there is a transmission on SL-SCH and provide the relevant HARQ information. A SCI consists of two parts: an initial part of the SCI on PSCCH and the remaining part of the SCI on PSSCH as specified in [x].

Editor's Note: FFS on support of a single SCI in RAN1 e.g. for broadcast.

The MAC entity shall:
1>for each PSCCH duration during which the MAC entity monitors PSCCH:
2>if an initial part of a SCI for this PSSCH duration has been received on the PSCCH:
3>determine the set of PSSCH durations in which reception of the remaining part of the SCI and the transport block occur using the received part of the SCI;
3>if the remaining part of the SCI for this PSSCH duration has been received on the PSSCH:
4>store the SCI as SCI valid for the PSSCH durations corresponding to transmission(s) of the transport block and the associated HARQ information and QoS information;
1>for each PSSCH duration for which the MAC entity has a valid SCI:
2>deliver the SCI and the associated HARQ information and QoS information to the Sidelink HARQ Entity.

5.x.2.2 Sidelink HARQ Operation
5.x.2.2.1 Sidelink HARQ Entity

There is at most one Sidelink HARQ Entity at the MAC entity for reception of the SL-SCH, which maintains a number of parallel Sidelink processes.

Each Sidelink process is associated with SCI in which the MAC entity is interested. This interest is as determined by the Destination Layer-1 ID and the Source Layer-1 ID of the SCI. The Sidelink HARQ Entity directs HARQ information and associated TBs received on the SL-SCH to the corresponding Sidelink processes.

The number of Receiving Sidelink processes associated with the Sidelink HARQ Entity is defined in [TBD].

For each PSSCH duration, the Sidelink HARQ Entity shall:
1>for each SCI valid for this PSSCH duration:
2>if this PSSCH duration corresponds to new transmission opportunity according to this SCI:
3>allocate the TB received from the physical layer and the associated HARQ information to an unoccupied Sidelink process, associate the Sidelink process with this SCI and consider this transmission to be a new transmission.
1>for each Sidelink process:
2>if this PSSCH duration corresponds to retransmission opportunity for the Sidelink process according to its associated SCI:
3>allocate the TB received from the physical layer and the associated HARQ information to the Sidelink process and consider this transmission to be a retransmission.

5.14.2.2.2 Sidelink Process

For each PSSCH duration where a transmission takes place for the Sidelink process, one TB and the associated HARQ information is received from the Sidelink HARQ Entity.

For each received TB and associated HARQ information, the Sidelink process shall:
1>if this is a new transmission:
2>attempt to decode the received data.
1>else if this is a retransmission:
2>if the data for this TB has not yet been successfully decoded:
3>instruct the physical layer to combine the received data with the data currently in the soft buffer for this TB and attempt to decode the combined data.
1>if the data which the MAC entity attempted to decode was successfully decoded for this TB; or
1>if the data for this TB was successfully decoded before:
2>if this is the first successful decoding of the data for this TB and [if the DST field of the decoded MAC PDU subheader is equal to the [x] MSB of any of the Destination Layer-2 ID(s) of the UE for which the [y] LSB are equal to the Destination ID in the corresponding SCI]:
Editor's Note: FFS for details of packet filtering.
3>deliver the decoded MAC PDU to the disassembly and demultiplexing entity;
3>consider the Sidelink process as unoccupied.

1>else:
  2>instruct the physical layer to replace the data in the soft buffer for this TB with the data which the MAC entity attempted to decode.
1>if HARQ feedback is configured with [a separate PSFCH resource i.e. option 2] for the Sidelink process; or
1>if HARQ feedback corresponding to this TB is configured with [a shared PSFCH resource i.e. option 1] and the communication range calculated based on the SCI valid for this PSSCH duration according to [TS 38.xxx] is smaller or equal to the requirement indicated in the SCI valid for this PSSCH duration:
  2>instruct the physical layer to generate acknowledgement(s) of the data in this TB.

5.14.2.3 Disassembly and Demultiplexing

The MAC entity shall disassemble and demultiplex a MAC PDU as defined in clause 6.x.

In R1-1908917, sidelink Channel State Information-Reference Signal (CSI-RS) reporting related procedure is discussed:

Sidelink CSI Report and Sidelink CSI-RS

In this section, we further discuss the details of CSI acquisition for sidelink unicast, including CSI report and the corresponding sidelink CSI-RS (SCSI-RS). The focus in this paper is on CSI report over SL.

4.1 Sidelink CSI Report Procedures

As agreed during SI, non-subband-based RI and CQI reports will be supported for sidelink unicast. In NR Uu transmissions, typically one RI value and the associated PMI and/or CQI are reported, where RI represents the maximum possible transmission rank of the measured channel. However, this may not be suitable for V2X applications which have diverse service requirements in terms of data rate and reliability. More specifically, some NR eV2X use cases may target high data rate while others target high reliability. On the other hand, single unicast connection will be established between the transmitter UE and the receiver UE which may carry different V2X services. Accordingly, to satisfy the diverse requirements, some services are interested in multi-layer transmissions while other services are interested in single layer transmissions. However, when the receiver reports CSI parameters, it is typically not aware of the transmitter's interest, e.g., the transmission requirement. In this case, it is beneficial to report multiple CQI values associated with different RI values respectively, which gives the transmitter the flexibility to select more proper transmission parameters based on its own needs.

One sidelink CSI report may include multiple CQIs associated with different RIs respectively.

Since it has been agreed to support up to two antenna ports, the rank of a PSSCH transmission can only be either 1 or 2. Hence, 1 bit is enough for RI. Moreover, for one CQI report, within a given CQI table, 4 bits are enough as in NR Uu. In this way, SL CSI report size is 5 bits when reporting one RI and its associated CQI. SL CSI report size is 9 bits when report two CQIs associated with rank-1 and rank-2 respectively.

SL CSI report size is up to 9 bits for NR Rel-16.

Furthermore, it has been clarified in WID [1] that for sidelink unicast, CSI is delivered using PSSCH (including PSSCH containing CSI only) using the resource allocation procedure for data transmission. Note that for a single UE, it is possible to have two scenarios:

1) CSI report only transmission;
2) Simultaneous CSI report and data transmissions.

In general, there are two ways to carry CSI report over SL.
Option 1: Carry as a separate MAC CE or an RRC message,
Option 2: Piggybacked in PSSCH as the way of carrying UCI over PUSCH.

We see some drawbacks of option 2. First, a proper piggyback design requires a large amount of simulations to evaluate various RE mappings and β offset values, which is quite challenging given the limited WID time. Second, and more importantly, piggyback solution is not good for forward compatibility, since in a later release we may have more CSI report parameters and thus a larger CSI report size. In that case, the current RE mappings and β offset values may not be valid anymore. Third, piggybacking in PSSCH implies that coding similar to UL polar code is used for CSI reporting which is not favourable as every UE will have to implement the corresponding codec. Therefore, we believe that only option 1 should be supported.

SL CSI report piggyback on PSSCH is not supported.

SL CSI report is carried in a TB on PSSCH.

When it comes to MAC CE and RRC, we think that MAC CE is more flexible compared to RRC. First consider the scenario where a UE has both data and CSI report targeting the same receiver UE. If MAC CE is used to carry CSI report, data and CSI report can be formed as either one TB (i.e., one PSSCH) or two separate TBs (i.e., two PSSCHs). On the other hand, if RRC is used to carry CSI report, data and CSI report can only be formed as two separate TBs (i.e., two PSSCHs). Furthermore, if CSI report is carried via MAC CE with its specifically configured LCID, no additional signalling in SCI is needed to indicate the presence of SL CSI report in the TB transmission. In addition, when a UE has only CSI report to transmit or a UE's data and CSI report targets different UEs, the UE can form two separate TBs, irrespective of CSI report carried by MAC CE or RRC.

For carrying CSI report over sidelink, MAC CE is more flexible compared to RRC.

Whether MAC CE or RRC is eventually used to carry CSI report, we think that it is in RAN2 domain and RAN1 leaves it up to RAN2 to decide. Furthermore, prioritization between CSI report and data transmissions should also be done and is also specified by RAN2.

It is up to RAN2 to decide if MAC CE or RRC message is used to carry CSI reports and the respective details specific to the solution.

For aperiodic CSI-report triggering, the TX UE can trigger sidelink report when it is needed, e.g., to perform link adaptation, adaptation of transmission layers, etc. For this purpose, the TX UE can include an indication in SCI to trigger the CSI report from the RX UE.

An indication in SCI is used to trigger sidelink CSI report from the RX UE.

4.2 Sidelink CSI-RS Procedures

It has been agreed in RAN1 #96bis to support sidelink CSI-RS for CQI/RI measurement, where CSI-RS is confined with the PSSCH transmission.

The SCSI-RS should be designed in such a way that it facilitates CSIT acquisition either in a reciprocity-based manner and/or in a feedback-based manner. Specifically, when channel reciprocity can be exploited, CSIT can be obtained using SCSI-RS transmitted by the peer UE. On the other hand, when channel reciprocity does not hold, SCSI-RS can be used to measure the channel and/or the interference which are then reported back to the transmitter to facilitate CSIT acquisition, which is considered as SL CSI report. Since SCSI-RS may or may not be present in a slot, we can use the SCI transmitted over PSCCH to indicate its presence.

The presence of SCSI-RS in a slot is indicated by an SCI carried by the PSCCH.

In Running CR to 38.321 for 5G V2X with NR sidelink, Channel State Information (CSI) reporting is discussed:

5.x.1.7 CSI Reporting

The Sidelink Channel State Information (SL-CSI) reporting procedure is used to provide a peer UE with sidelink channel state information as specified in clause 8.5 of TS 38.214 [7]. RRC configures CSIsiReporting to enable the SL-CSI reporting procedure.

The MAC entity shall for each pair of the Source Layer-2 ID and the Destination Layer-2 ID:

1>if the SL-CSI reporting has been triggered and not cancelled:
2>if the MAC entity has SL resources allocated for new transmission:
3>instruct the Multiplexing and Assembly procedure to generate a Sidelink CSI Reporting MAC CE as defined in clause 6.1.3.z;
3>cancel the triggered SL-CSI reporting.
2>else if the MAC entity has a SL-RNTI or SLCS-RNTI:
3>trigger a Scheduling Request.

In RP-193257 Work item for sidelink enhancement, Discontinuous Reception (DRX) on sidelink is discussed. For a UE to monitor Physical Sidelink Control Channel (PSCCH) (e.g., sidelink control information (SCI)), it is necessary for one or more timing durations associated with monitoring PSCCH (e.g., SCI) to be defined. In NR Uu, a UE may discontinuously monitor Physical Downlink Control Channel (PDCCH) based on a DRX configuration (e.g., a DRX configuration with which the UE is configured). The UE may monitor PDCCH during active time of the UE. The active time may be determined and/or configured by the DRX configuration, for example. The UE may not monitor PDCCH outside of the active time (e.g., when the UE is not in active time). The active time may include a time during which (and/or the UE may be in active time during a time in which) at least one of: 1) drx-onDurationTimer, drx-InactivityTimer, drx-RetransmissionTimerDL, drx-RetransmissionTimerUL, and/or ra-ContentionResolutionTimer (and/or a different timer associated with the active time) is running; 2) a Scheduling Request is (or was) sent on PUCCH and is pending; or 3) a PDCCH indicating a new transmission addressed to a C-RNTI of a Medium Access Control (MAC) entity has not been received after successful reception of a Random Access Response for a Random Access Preamble not selected by the MAC entity among the contention-based Random Access Preamble.

In NR Uu, the drx-onDurationTimer is configured by a network. The drx-onDurationTimer may be started (and/or restarted) (e.g., the drx-onDurationTimer may start running) based on a Short DRX Cycle configuration or a Long DRX Cycle configuration. The drx-InactivityTimer may be started (and/or restarted) (e.g., the rx-InactivityTimer may start running) if (and/or in response to) the PDCCH indicates a new transmission (e.g., a downlink (DL) transmission and/or an uplink (UL) transmission). The drx-RetransmissionTimerUL may be started (and/or restarted) (e.g., the drx-RetransmissionTimerUL may start running) after (and/or in response to) expiry of a timer, such as drx-HARQ-RTT-TimerUL. The drx-RetransmissionTimerDL may be started (and/or restarted) (e.g., the drx-RetransmissionTimerDL may start running) after (and/or in response to) expiry of a timer, such as drx-HARQ-RTT-TimerDL.

In NR sidelink (NR SL), a transmitter UE (Tx UE) may request Channel State Information (CSI) reporting via a sidelink signaling (e.g., SCI). In NR sidelink, CSI reporting may be transmitted via a MAC control element (MAC CE).

Figure 5:
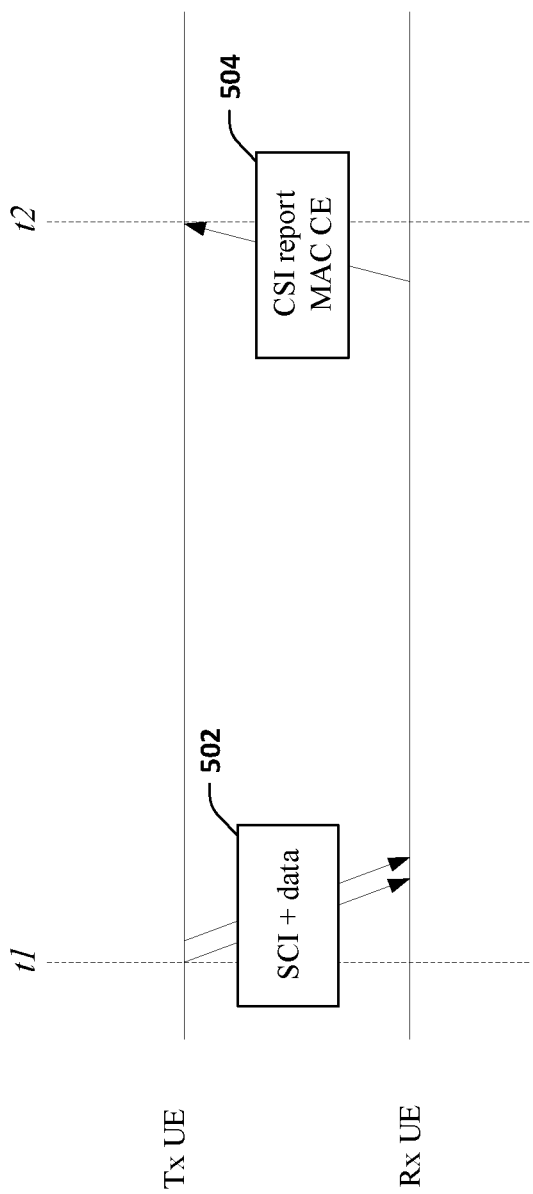
FIG. 5 is a diagram illustrating an exemplary scenario associated with a transmitter UE (Tx UE) requesting a receiver UE (Rx UE) to transmit a channel state information (CSI) report via sidelink.

An issue may occur if a Tx UE requests a receiver UE (Rx UE) to transmit a CSI report via sidelink. An example of the issue is shown in FIG. 5, which illustrates a timing diagram of an exemplary scenario associated with a Tx UE requesting a Rx UE to transmit a CSI report via sidelink. The Tx UE (a timeline of which is labeled "Tx UE" in FIG. 5) performs one or more sidelink transmissions 502 to a Rx UE (a timeline of which is labeled "Rx UE" in FIG. 5) for requesting a CSI report from the Rx UE. For example, the one or more sidelink transmissions 502 may comprise a SCI (e.g., a SCI comprising and/or indicating a CSI report request requesting a CSI report from the Rx UE) and/or data. In some examples, at least one of the one or more sidelink transmissions 502 may be performed by the Tx UE at a time t1. The Rx UE may transmit a CSI report MAC CE 504 (e.g., a MAC CE comprising a CSI report) to the Tx UE in response to receiving the one or more sidelink transmissions 502 (and/or in response to receiving the SCI and/or the CSI report request). In some examples, the Rx UE may transmit the CSI report MAC CE 504 using mode-1 sidelink grant and/or mode-2 sidelink grant. The CSI report MAC CE 504 may be transmitted by the Rx UE (and/or the CSI report MAC CE 504 may reach the Tx UE) at a time t2. If the Tx UE applies a sidelink DRX configuration (e.g., if the Tx UE uses and/or performs sidelink DRX operation in accordance with the sidelink DRX configuration), the Tx UE may not be in active time when the Rx UE transmits the CSI report MAC CE 504 (e.g., the CSI report MAC CE 504 may be transmitted outside active time of the Tx UE). For example, the Tx UE may not monitor a sidelink control channel at the time t2. Accordingly, the Tx UE may experience data loss, the Tx UE may not be able to receive and/or detect the CSI report MAC CE 504 and/or the Tx UE may not be able to determine and/or acknowledge channel status from the Rx UE.

Accordingly, one or more devices and/or techniques are provided herein to solve the above issues (e.g., a Tx UE not being able to receive and/or detect a CSI report and/or not being able to determine and/or acknowledge channel status from a Rx UE, such as due to the CSI report being transmitted when the Tx UE is not in active time). For example, after a Tx UE transmits a sidelink transmission comprising a CSI report request (e.g., a request for a CSI report), the Tx UE monitors PSCCH for SCI of the Rx UE and/or data associated with a CSI report (e.g., a CSI report MAC CE) associated with the CSI report request. For example, the Tx UE may be in active time after the Tx UE transmits the sidelink transmission, and the Tx UE may monitor PSCCH for SCI of the Rx UE and/or data associated with the CSI report when the Tx UE is in active time (e.g., during active time of the Tx UE).

In some examples, the Tx UE may be in active time (and/or may monitor PSCCH for SCI of the Rx UE and/or data associated with the CSI report) based on a timer. For example, the timer may be started (or restarted) (by the Tx UE) in response to transmitting the sidelink transmission (comprising the CSI report request). The Tx UE may be in active time and/or may monitor PSCCH (for SCI of the Rx UE and/or data associated with the CSI report, for example) while the timer is running. In an example, the Tx UE may enter active time and/or remain in active time and/or stay in active time after (and/or in response to) transmitting the sidelink transmission based on the timer starting (or restarting) in response to transmitting the sidelink transmission. The Tx UE may remain in active time (and/or may monitor PSCCH for SCI of the Rx UE and/or data associated with the CSI report) at least until expiry of the timer and/or the timer being stopped. In an example, the timer may be stopped when the Tx UE receives the CSI report (e.g., the desired CSI report associated with the CSI report request). In some examples, the Tx UE may stop being in active time (and/or may stop being awake and/or may stop monitoring PSCCH for SCI of the Rx UE and/or data associated with the CSI report) when (and/or in response to) the timer is stopped and/or the CSI report (e.g., the desired CSI report associated with the CSI report request) is received.

In some examples, the Tx UE may be in active time (and/or may be awake and/or may monitor PSCCH for SCI of the Rx UE and/or data associated with the CSI report) at least until the CSI report is received from the Rx UE. For example, the Tx UE may enter active time and/or remain in active time and/or stay in active time (and/or may be awake and/or may monitor PSCCH for SCI of the Rx UE and/or data associated with the CSI report) after (and/or in response to) transmitting the sidelink transmission.

In some examples, the Tx UE may be in active time (and/or may be awake and/or may monitor PSCCH for SCI of the Rx UE and/or data associated with the CSI report) at least during a time window associated with the CSI report request and/or the CSI report. In some examples, the time window begins at (and/or after) transmission of the CSI report request (and/or the time window is triggered in response to transmission of the CSI report request). In an example, the time window may correspond to a CSI report availability time (e.g., an availability time of a CSI report triggered and/or requested by the CSI report request). For example, the time window (and/or a duration of the time window) and/or the CSI report availability time may be configured to prevent reception (and/or transmission) of an out of date CSI report. For example, the Rx UE may be configured to transmit, and/or the Tx UE may be configured to receive, the CSI report within the time window (such that the CSI report is not out of date, for example). In an example, the time window begins at a time after transmission of the CSI report request. For example, the time at which the time window begins may be a time offset after transmission of the CSI report request. The Tx UE (and/or the Rx UE) may be configured with (and/or pre-configured with) the time offset. Accordingly, the Tx UE (and/or the Rx UE) may determine the time window within which the CSI report is to be received (e.g., the time window within which the Tx UE expects to receive the CSI report from the Rx UE). The Tx UE may determine the time window based on a time at which the CSI report request is transmitted and/or based on the time offset. The Tx UE may enter active time and/or remain in active time (and/or may be awake and/or may monitor PSCCH for SCI of the Rx UE and/or data associated with the CSI report) at the beginning of the time window and/or when the time offset passed after transmission of the CSI report request. In an example in which the Tx UE transmits the CSI report request at a time t1, and the time offset is 5 seconds, the Tx UE may enter active time and/or remain in active time (and/or may be awake and/or may monitor PSCCH for SCI of the Rx UE and/or data associated with the CSI report) at (and/or after) a time t2=t1+5 seconds. In some examples, the Tx UE may remain in active time (and/or may be awake and/or may monitor PSCCH for SCI of the Rx UE and/or data associated with the CSI report) at least until the earlier of the end of the time window or reception of the CSI report (e.g., the desired CSI report associated with the CSI report request) by the Tx UE. For example, the Tx UE may stop being in active time (and/or may stop being awake and/or may stop monitoring PSCCH for SCI of the Rx UE and/or data associated with the CSI report) when (and/or in response to) the Tx UE receives the CSI report (e.g., the desired CSI report associated with the CSI report request). Alternatively and/or additionally, the Tx UE may stop being in active time (and/or may stop being awake and/or may stop monitoring PSCCH for SCI of the Rx UE and/or data associated with the CSI report) at (and/or in response to) the earlier of the end of the time window or reception of the CSI report (e.g., the desired CSI report associated with the CSI report request) by the Tx UE.

In some examples, a time length of the timer (e.g., a duration of time that the timer runs until expiry) is associated with, equal to and/or based on the CSI report availability time. Alternatively and/or additionally, the timer may be started and/or restarted at (and/or after) the time offset passed after transmission of the CSI report request. In an example in which the Tx UE transmits the CSI report request at a time t1, and the time offset is 5 seconds, the timer may be started and/or restarted at (and/or after) a time t2=t1+5 seconds.

A first concept of the present disclosure is that a Tx UE may monitor PSCCH, for a duration of time, after performing a sidelink transmission to a Rx UE. The sidelink transmission may be associated with (and/or may comprise) a first SCI indicating a first CSI report request (e.g., a request for a CSI report from the Rx UE).

The Tx UE may not stop monitoring PSCCH (except for timings in which transmissions of the Tx UE occur and/or are performed, for example) until the Tx UE receives a CSI report (e.g., a desired CSI report associated with the first CSI report request) from the Rx UE. For example, the Tx UE may monitor (and/or keep monitoring and/or continue monitoring) PSCCH (except for timings in which transmissions of the Tx UE occur and/or are performed, for example) until the Tx UE receives a CSI report (e.g., a desired CSI report associated with the first CSI report request) from the Rx UE.

In some examples, the Tx UE may start or restart a timer in response to (and/or after) the sidelink transmission. Alternatively and/or additionally, the Tx UE may start or restart the timer at and/or after a first time offset passes after the Tx UE transmits the sidelink transmission. In an example in which the Tx UE transmits the sidelink transmission at a time t1, and the first time offset is 5 seconds, the timer may be started and/or restarted at (and/or after) a time t2=t1+5 seconds. Alternatively and/or additionally, the Tx UE may start or restart the timer in response to (and/or after) receiving sidelink Hybrid Automatic Repeat Request-Acknowledgment (SL HARQ-ACK) associated with the sidelink transmission (e.g., sidelink HARQ ACK, from the Rx UE, indicating whether the Rx UE successfully received and/or decoded the sidelink transmission). Alternatively and/or additionally, the Tx UE may start or restart the timer at and/or after a second time offset passes after the Tx UE receives the sidelink HARQ-ACK associated with the sidelink transmission. In an example in which the Tx UE receives the sidelink HARQ-ACK associated with the sidelink transmission at a time t3, and the second time offset is 5 seconds, the timer may be started and/or restarted at (and/or after) a time t4=t3+5 seconds. In some examples, the sidelink HARQ-ACK may be acknowledgment (ACK) or negative acknowledgment (NACK). In some examples, the sidelink HARQ-ACK is not Discontinuous Transmission (DTX).

In some examples, the Tx UE may not start or restart the timer in response to the sidelink transmission if the sidelink transmission is not associated with (and/or does not comprise and/or indicate) a SCI indicating a CSI report request.

In some examples, the Tx UE may stop the timer when the Tx UE receives a CSI report (e.g., a desired CSI report associated with the first CSI report request) from the Rx UE.

In some examples, the Tx UE may monitor (and/or keep monitoring and/or continue monitoring) PSCCH (except for timings in which transmissions of the Tx UE occur and/or are performed, for example) when the timer is running.

In some examples, a time length of the timer may be specified and/or configured (and/or pre-configured). For example, the Tx UE may be configured (and/or pre-configured) with the time length of the timer. In some examples, the timer is configured and/or operated (e.g., operated by the Tx UE) for a link between the Tx UE and one or more UEs comprising the Rx UE.

In some examples, the first time offset (e.g., a duration of the first time offset) and/or the second time offset (e.g., a duration of the second time offset) may be specified and/or configured (and/or pre-configured). For example, the Tx UE may be configured (and/or pre-configured) with the first time offset (e.g., the duration of the first time offset) and/or the second time offset (e.g., the duration of the second time offset).

Figure 6:
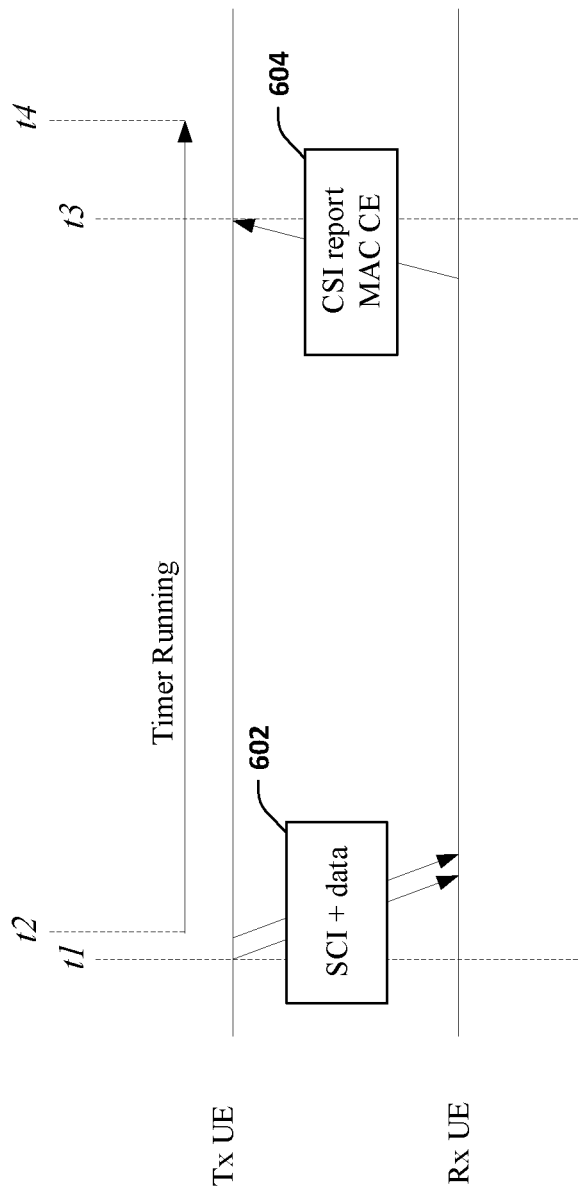
FIG. 6 is a diagram illustrating an exemplary scenario associated with a Tx UE requesting a Rx UE to transmit a CSI report via sidelink, according to one embodiment.

FIG. 6 illustrates a timing diagram of an exemplary scenario associated with a Tx UE requesting a Rx UE to transmit a CSI report via sidelink, according to some embodiments. The Tx UE (a timeline of which is labeled "Tx UE" in FIG. 6) performs one or more sidelink transmissions 602 to a Rx UE (a timeline of which is labeled "Rx UE" in FIG. 6) for requesting a CSI report from the Rx UE. For example, the one or more sidelink transmissions 602 may comprise a SCI (e.g., a SCI comprising and/or indicating a CSI report request) and/or data (e.g., sidelink data). For example, the Tx UE may transmit the sidelink data with the SCI. In some examples, at least one of the one or more sidelink transmissions 602 may be performed by the Tx UE at a time t1. The Rx UE may transmit a CSI report MAC CE 604 (e.g., a MAC CE comprising the CSI report) to the Tx UE in response to receiving the one or more sidelink transmissions 602 (and/or in response to receiving the SCI and/or the CSI report request). In some examples, the Rx UE may transmit the CSI report MAC CE 604 using mode-1 sidelink grant and/or mode-2 sidelink grant. The CSI report MAC CE 604 may be transmitted by the Rx UE (and/or the CSI report MAC CE 604 may reach the Tx UE) at a time t3. In some examples, in response to performing the one or more sidelink transmissions 602 (and/or in response to transmitting the SCI and/or in response to transmitting the sidelink data), the Tx UE may start or restart a timer at a time t2. In some examples, the time t2 is the same as the time t1. Alternatively and/or additionally, the time t2 may be after the time t1. The Tx UE may be in active time and/or may monitor PSCCH (and/or monitor SCI from the Rx UE) when the timer is running. The timer may be running during the time t3. Accordingly, the Tx UE may monitor PSCCH (and/or monitor SCI from the Rx UE) at the time t3 and the Tx UE may receive the CSI report MAC CE 604. In some examples, the timer may run until the timer expires at a time t4, after the time t3. Alternatively and/or additionally, the Tx UE may stop the timer in response to receiving the CSI report MAC CE 604 at the time t3.

Figure 7:
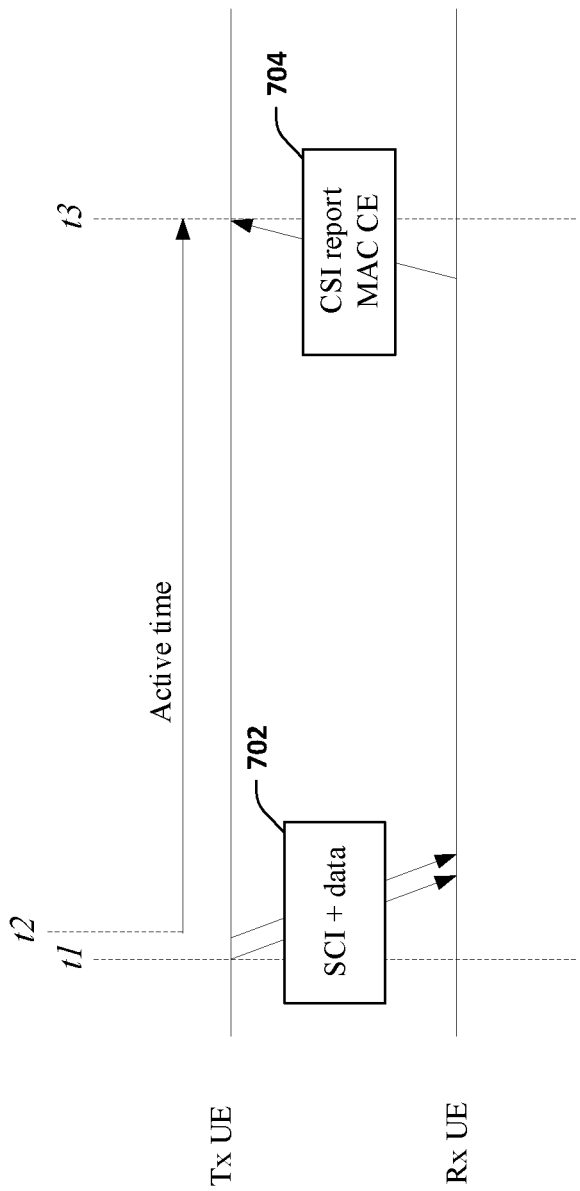
FIG. 7 is a diagram illustrating an exemplary scenario associated with a Tx UE requesting a Rx UE to transmit a CSI report via sidelink, according to one embodiment.

FIG. 7 illustrates a timing diagram of an exemplary scenario associated with a Tx UE requesting a Rx UE to transmit a CSI report via sidelink, according to some embodiments. The Tx UE (a timeline of which is labeled "Tx UE" in FIG. 7) performs one or more sidelink transmissions 702 to a Rx UE (a timeline of which is labeled "Rx UE" in FIG. 7) for requesting a CSI report from the Rx UE. For example, the one or more sidelink transmissions 702 may comprise a SCI (e.g., a SCI comprising and/or indicating a CSI report request) and/or data (e.g., sidelink data). For example, the Tx UE may transmit the sidelink data with the SCI. In some examples, at least one of the one or more sidelink transmissions 702 may be performed by the Tx UE at a time t1. The Rx UE may transmit a CSI report MAC CE 704 (e.g., a MAC CE comprising the CSI report) to the Tx UE in response to receiving the one or more sidelink transmissions 702 (and/or in response to receiving the SCI and/or the CSI report request). In some examples, the Rx UE may transmit the CSI report MAC CE 704 using mode-1 sidelink grant and/or mode-2 sidelink grant. The CSI report MAC CE 704 may be transmitted by the Rx UE (and/or the CSI report MAC CE 704 may reach the Tx UE) at a time t3. In some examples, in response to performing the one or more sidelink transmissions 702 (and/or in response to transmitting the SCI and/or in response to transmitting the sidelink data), the Tx UE may enter and/or continue being in active time at a time t2. In some examples, the time t2 is the same as the time t1. Alternatively and/or additionally, the time t2 may be after the time t1. The Tx UE may be in active time and/or may monitor PSCCH (and/or monitor SCI from the Rx UE) until the Tx UE receives the CSI report MAC CE 704 associated with the CSI report request (at the time t3, for example).

A second concept of the present disclosure is that a Tx UE may start (or restart) a first timer in response to performing a sidelink transmission to a Rx UE. The sidelink transmission may be associated with (and/or may comprise) a first SCI indicating a first CSI report request from the Rx UE. The Tx UE monitors a sidelink control channel when the first timer is running. Alternatively and/or additionally, the Tx UE may start (or restart) a second timer in response to performing the sidelink transmission. The Tx UE may start (or restart) the first timer in response to expiry of the second timer. In some examples, Tx UE may not monitor a sidelink control channel when the second timer is running.

Figure 8:
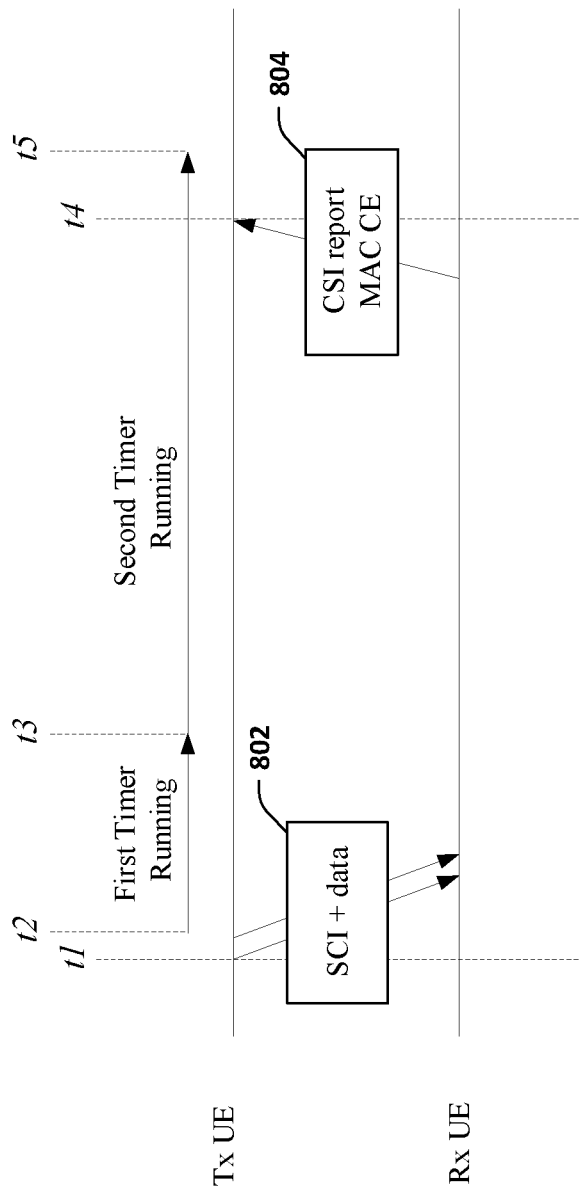
FIG. 8 is a diagram illustrating an exemplary scenario associated with a Tx UE requesting a Rx UE to transmit a CSI report via sidelink, according to one embodiment.

An example is shown in FIG. 8, which illustrates a timing diagram of an exemplary scenario associated with a Tx UE requesting a Rx UE to transmit a CSI report via sidelink, according to some embodiments. The Tx UE (a timeline of which is labeled "Tx UE" in FIG. 8) performs one or more sidelink transmissions 802 to a Rx UE (a timeline of which is labeled "Rx UE" in FIG. 8) for requesting a CSI report from the Rx UE. For example, the one or more sidelink transmissions 802 may comprise a SCI (e.g., a SCI comprising and/or indicating a CSI report request) and/or data (e.g., sidelink data). For example, the Tx UE may transmit the sidelink data with the SCI. In some examples, at least one of the one or more sidelink transmissions 802 may be performed by the Tx UE at a time t1. The Rx UE may transmit a CSI report MAC CE 804 (e.g., a MAC CE comprising the CSI report) to the Tx UE in response to receiving the one or more sidelink transmissions 802 (and/or in response to receiving the SCI and/or the CSI report request). In some examples, the Rx UE may transmit the CSI report MAC CE 804 using mode-1 sidelink grant and/or mode-2 sidelink grant. The CSI report MAC CE 804 may be transmitted by the Rx UE (and/or the CSI report MAC CE 804 may reach the Tx UE) at a time t4. In some examples, in response to performing the one or more sidelink transmissions 802 (and/or in response to transmitting the SCI and/or in response to transmitting the sidelink data), the Tx UE may start or restart a first timer at a time t2. In some examples, the time t2 is the same as the time t1. Alternatively and/or additionally, the time t2 may be after the time t1. The Tx UE may not monitor PSCCH (and/or the Tx UE may not monitor SCI) when the first timer is running. In some examples, at a time t3, the Tx UE starts (and/or restarts) a second timer in response to expiry of the first timer. In some examples, the Tx UE may be in active time and/or may monitor PSCCH (and/or monitor SCI from the Rx UE) when the second timer is running. The second timer may be running during the time t4. Accordingly, the Tx UE may monitor PSCCH (and/or monitor SCI from the Rx UE) at the time t4 and the Tx UE may receive the CSI report MAC CE 804. In some examples, the second timer may run until the second timer expires at a time t5, after the time t4. Alternatively and/or additionally, the Tx UE may stop the second timer in response to receiving the CSI report MAC CE 804 at the time t4.

Figure 9:
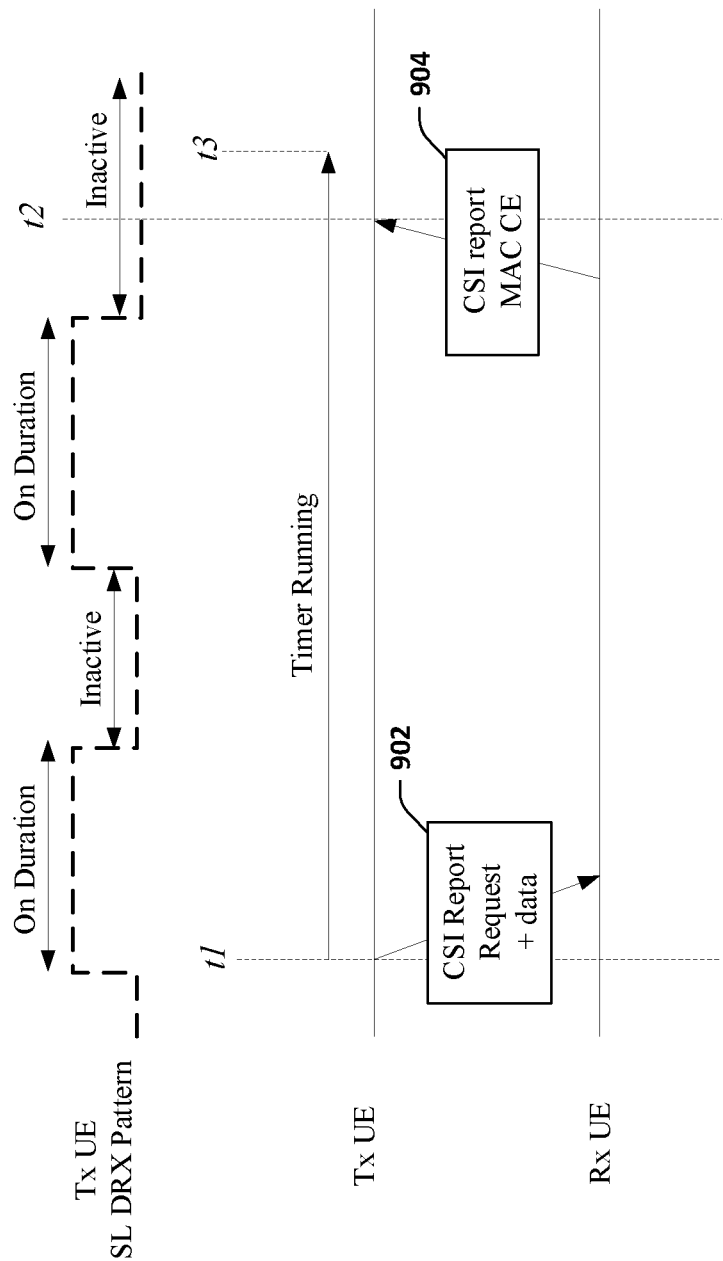
FIG. 9 is a diagram illustrating an exemplary scenario associated with a Tx UE requesting a Rx UE to transmit a CSI report via sidelink, according to one embodiment.

FIG. 9 illustrates a timing diagram of an exemplary scenario associated with a Tx UE requesting a Rx UE to transmit a CSI report via sidelink, according to some embodiments. The Tx UE (a timeline of which is labeled "Tx UE" in FIG. 9) is configured with and/or operates using a sidelink DRX configuration associated with a sidelink DRX pattern (a timeline of which is labeled "Tx UE SL DRX Pattern" in FIG. 9). The Tx UE may monitor one or more sidelink channels when the Tx UE is in sidelink active time, such as during "On Duration" periods of the sidelink DRX pattern. Alternatively and/or additionally, the Tx UE may not monitor one or more sidelink channels when the Tx UE is not in sidelink active time, such as during "Inactive" periods of the sidelink DRX pattern. The Tx UE performs sidelink communication with a Rx UE (a timeline of which is labeled "Rx UE" in FIG. 9). The Tx UE transmits one or more transmissions 902 to the Rx UE, wherein the one or more transmissions 902 comprise a CSI report request and/or data (e.g., sidelink data). At least one of the one or more transmissions 902 may be performed by the Tx UE at a time t1. The Rx UE may generate a CSI report MAC CE 904 (e.g., a MAC CE comprising the CSI report) in response to receiving the one or more transmissions 902 (and/or in response to receiving the CSI report request) and/or the Rx UE may transmit the CSI report MAC CE 904 to the Tx UE. In some examples, the Rx UE may transmit the CSI report MAC CE 904 using mode-1 sidelink grant and/or mode-2 sidelink grant. The CSI report MAC CE 904 may be transmitted by the Rx UE (and/or the CSI report MAC CE 904 may reach the Tx UE) at a time t2. In some examples, in response to performing the one or more transmissions 902 (and/or in response to transmitting the CSI report request), the Tx UE may start or restart a timer at the time t1 (and/or after the time t1). In some examples, the Tx UE may be in active time and/or the Tx UE may monitor the one or more sidelink channels when the timer is running. The timer may be running during the time t2. Accordingly, the Tx UE may monitor the one or more sidelink channels at the time t2 and the Tx UE may receive the CSI report MAC CE 904. For example, even though the sidelink DRX pattern corresponds to the Tx UE being in inactive time at the time t2 (e.g., the time t2 is not within an On Duration period of the sidelink DRX pattern), the Tx UE may be in active time and/or may monitor the one or more sidelink channels at the time t2 based on the timer running at the time t2. In some examples, the timer may run until the timer expires at a time t3, after the time t2. Alternatively and/or additionally, the Tx UE may stop the timer in response to receiving the CSI report MAC CE 904 at the time t2.

A third concept of the present disclosure is that a Rx UE may report a DRX configuration associated with a Tx UE to a base station. The base station may schedule, based on the DRX configuration, a sidelink grant for the Rx UE to perform one or more sidelink transmissions to the Tx UE when the Tx UE is in active time. For example, the sidelink grant may be indicative of one or more sidelink resources for performance of the one or more sidelink transmissions, wherein the one or more sidelink resources are within active time of the Tx UE (e.g., the Tx UE is in active time during each resource of the one or more sidelink resources). In an example, the Rx UE may use at least one sidelink resource of the one or more sidelink resources to transmit a CSI report to the Tx UE (in response to the Rx UE receiving a CSI report request from the Tx UE, for example).

A fourth concept of the present disclosure is that a Rx UE may use autonomous resource selection for transmitting a CSI report MAC CE to a Tx UE. The Rx UE may select one or more sidelink resources, for transmission of the CSI report MAC CE to the Tx UE, that are during active time of the Tx UE. For example, the one or more sidelink resources may be selected based on a determination that the one or more sidelink resources are during the active time of the Tx UE, such that the CSI report MAC CE is transmitted to the Tx UE at a time in which the Tx UE is in active time. Alternatively and/or additionally, the one or more sidelink resources may be selected from sidelink resources at timings at which the Tx UE is in active time. The sidelink resources, from which the one or more sidelink resources are selected, may not comprise sidelink resources at timings in which the Tx UE is not in active time. For example, the Rx UE may not select the one or more sidelink resources from sidelink resources at timings at which the Tx UE is not in active time. In some examples, the Rx UE may switch to autonomous resource selection for selecting the one or more sidelink resources for transmission of the CSI report MAC CE to the Tx UE. For example, the Rx UE may switch to autonomous resource selection in response to receiving a CSI report request from the Tx UE and/or based on a determination that the Tx UE monitors based on a sidelink DRX configuration.

With respect to one or more embodiments herein, such as one or more techniques, devices, concepts, methods and/or alternatives described above, the Tx UE may consider that the Tx UE is in active time (e.g., sidelink active time) when the timer (and/or the first timer and/or the second timer) is running.

With respect to one or more embodiments herein, the Tx UE may monitor one or more sidelink control channels (e.g., PSCCH or Physical Sidelink Feedback Channel (PSFCH)) if the Tx UE is in active time (e.g., sidelink active time). For example, the Tx UE may monitor the one or more sidelink control channels during active time (e.g., sidelink active time) of the Tx UE.

With respect to one or more embodiments herein, the Tx UE may not monitor the one or more sidelink control channels, based on the timer, for one or more retransmissions (e.g., one or more possible retransmissions).

With respect to one or more embodiments herein, the Tx UE may be performing unicast communication with the Rx UE.

With respect to one or more embodiments herein, the Tx UE may be performing groupcast communication with the Rx UE.

With respect to one or more embodiments herein, a sidelink-CSI (SL-CSI) report may be triggered for and/or at the Rx UE in response to the Rx UE receiving a SCI indicating a CSI report request.

With respect to one or more embodiments herein, the Rx UE may generate a CSI report MAC CE (and/or transmit the MAC CE to the Tx UE) in response to the SL-CSI report being triggered.

With respect to one or more embodiments herein, the one or more sidelink transmissions may comprise a SCI transmission.

With respect to one or more embodiments herein, the one or more sidelink transmissions may comprise a sidelink data transmission. Alternatively and/or additionally, the one or more sidelink transmissions may not comprise (and/or may not be) a sidelink data transmission.

One, some and/or all of the foregoing techniques and/or embodiments can be formed to a new embodiment.

In some examples, embodiments disclosed herein, such as embodiments described with respect to the first concept, the second concept, the third concept and the fourth concept, may be implemented independently and/or separately. Alternatively and/or additionally, a combination of embodiments described herein, such as embodiments described with respect to the first concept, the second concept, the third concept and/or the fourth concept, may be implemented. Alternatively and/or additionally, a combination of embodiments described herein, such as embodiments described with respect to the first concept, the second concept, the third concept and/or the fourth concept, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 10:
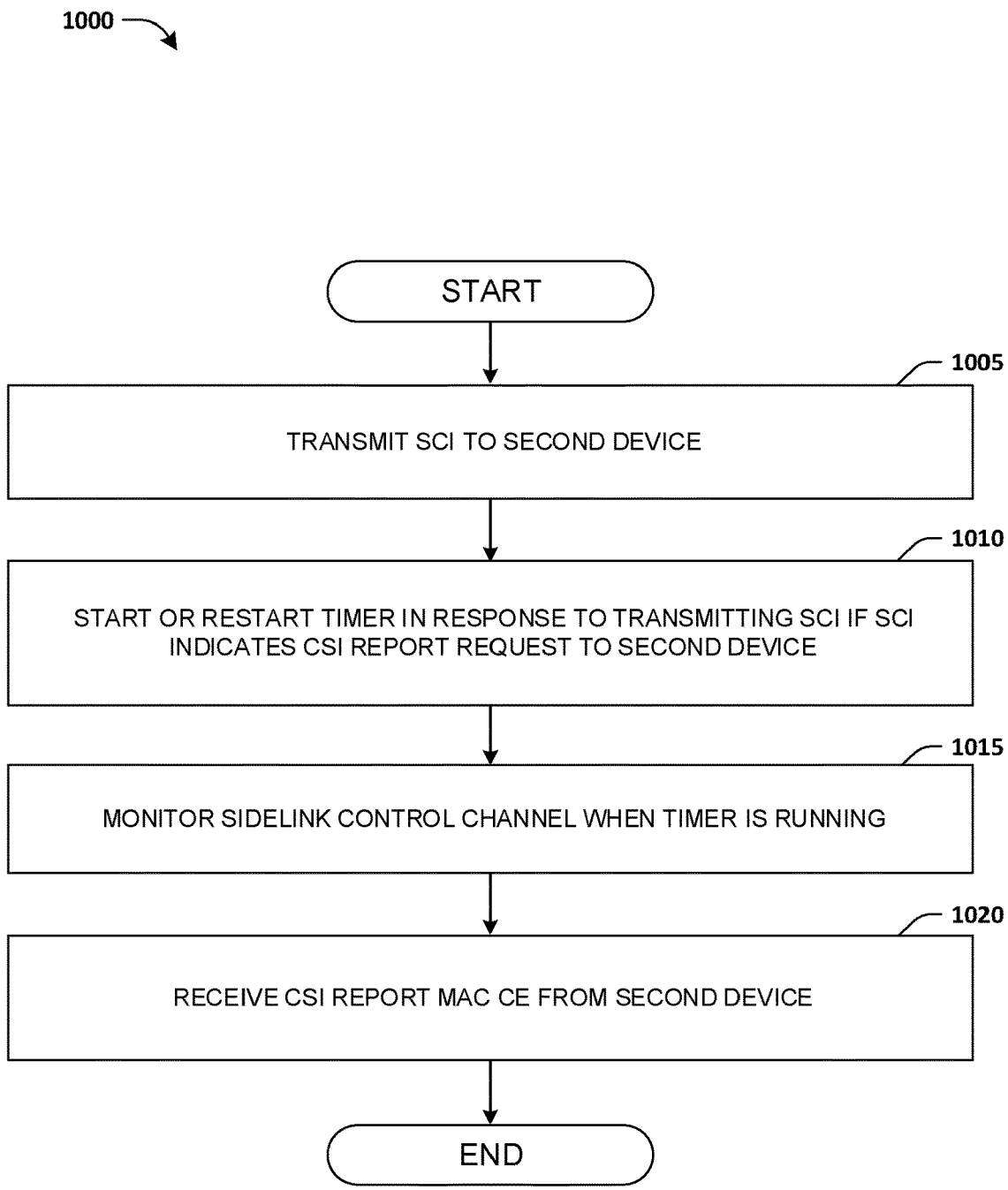
FIG. 10 is a flow chart according to one exemplary embodiment.

FIG. 10 is a flow chart 1000 according to one exemplary embodiment from the perspective of a first device. In step 1005, the first device transmits a SCI to a second device. In step 1010, the first device starts or restarts a timer in response to transmitting the SCI if the SCI indicates a CSI report request (e.g., a request for a CSI report) to the second device. In step 1015, the first device monitors a sidelink control channel when the timer is running. In step 1020, the first device receives a CSI report MAC CE from the second device.

In one embodiment, the first device does not start the timer if the SCI does not indicate a CSI report request.

In one embodiment, the first device stops the timer in response to receiving the CSI report MAC CE.

In one embodiment, the first device is in active time when the timer is running.

In one embodiment, the second device transmits the CSI report MAC CE to the first device in response to the SCI indicating the CSI report request.

Referring back to FIGS. 3 and 4, in one exemplary embodiment of a first device, the device 300 includes a program code 312 stored in the memory 310. The CPU 308 could execute program code 312 to enable the first device (i) to transmit a SCI to a second device, (ii) to start or restart a timer in response to transmitting the SCI if the SCI indicates a CSI report request to the second device, (iii) to monitor a sidelink control channel when the timer is running, and (iv) to receive a CSI report MAC CE from the second device. Furthermore, the CPU 308 can execute the program code 312 to perform one, some and/or all of the above-described actions and steps and/or others described herein.

Figure 11:
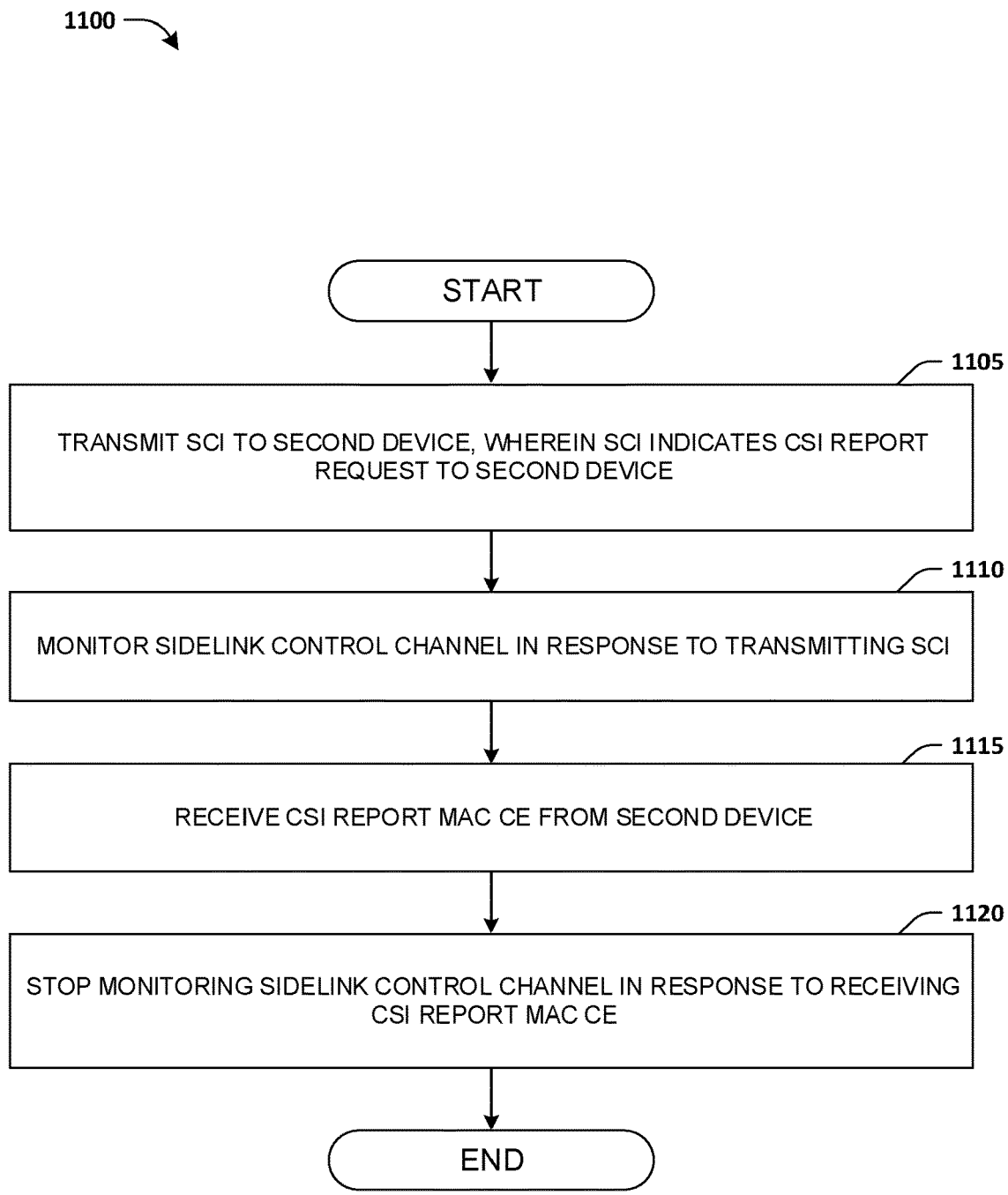
FIG. 11 is a flow chart according to one exemplary embodiment.

FIG. 11 is a flow chart 1100 according to one exemplary embodiment from the perspective of a first device. In step 1105, the first device transmits a SCI to a second device, wherein the SCI indicates a CSI report request (e.g., a request for a CSI report) to the second device. In step 1110, the first device monitors a sidelink control channel in response to transmitting the SCI. In step 1115, the first device receives a CSI report MAC CE from the second device. In step 1120, the first device stops monitoring the sidelink control channel in response to receiving the CSI report MAC CE.

In one embodiment, the first device is in active time from a time at or after transmission of the SCI at least until the first device receives the CSI report MAC CE.

In one embodiment, the second device transmits the CSI report MAC CE to the first device in response to the SCI indicating the CSI report request.

Referring back to FIGS. 3 and 4, in one exemplary embodiment of a first device, the device 300 includes a program code 312 stored in the memory 310. The CPU 308 could execute program code 312 to enable the first device (i) to transmit a SCI to a second device, wherein the SCI indicates a CSI report request (e.g., a request for a CSI report) to the second device, (ii) to monitor a sidelink control channel in response to transmitting the SCI, (iii) to receive a CSI report MAC CE from the second device, and (iv) to stop monitoring the sidelink control channel in response to receiving the CSI report MAC CE. Furthermore, the CPU 308 can execute the program code 312 to perform one, some and/or all of the above-described actions and steps and/or others described herein.

Figure 12:
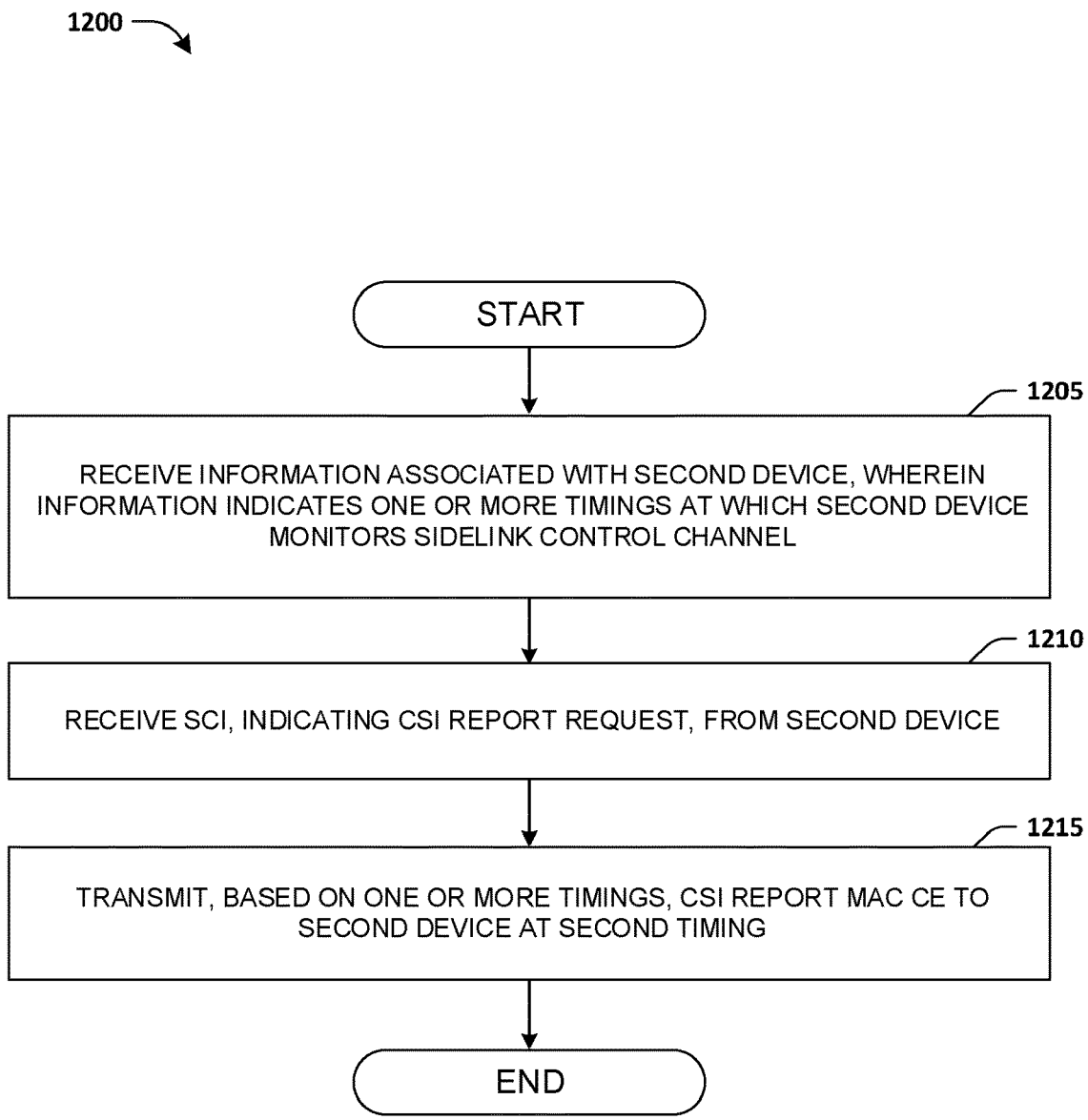
FIG. 12 is a flow chart according to one exemplary embodiment.

FIG. 12 is a flow chart 1200 according to one exemplary embodiment from the perspective of a first device. In step 1205, the first device receives information associated with a second device, wherein the information indicates one or more timings at which the second device monitors sidelink control channel. In step 1210, the first device receives a SCI, indicating a CSI report request, from the second device. In step 1215, the first device transmits, based on the one or more timings, a CSI report MAC CE to the second device at a second timing.

In one embodiment, the second timing is associated with the one or more timings.

In one embodiment, the second timing is a timing of the one or more timings.

In one embodiment, the second timing is within a timing of the one or more timings.

In one embodiment, the CSI report MAC CE is not transmitted at a timing that is not included in and/or indicated by the one or more timings at which the second device monitors sidelink control channel. For example, the second timing at which the first device transmits the CSI report MAC CE may be included in and/or indicated by the one or more timings at which the second device monitors sidelink control channel (e.g., the second timing may correspond to at least a portion of a timing of the one or more timings).

In one embodiment, the first device does not select a sidelink resource, for transmission of the CSI report MAC CE to the second device, that is associated with (e.g., within) a timing that is not included in and/or indicated by the one or more timings at which the second device monitors sidelink control channel. For example, the first device may select a first sidelink resource, for transmission of the CSI report MAC CE to the second device, that is within a timing that is included in and/or indicated by the one or more timings at which the second device monitors sidelink control channel (e.g., the first sidelink resource may be within at least a portion of a timing of the one or more timings).

Referring back to FIGS. 3 and 4, in one exemplary embodiment of a first device, the device 300 includes a program code 312 stored in the memory 310. The CPU 308 could execute program code 312 to enable the first device (i) to receive information associated with a second device, wherein the information indicates one or more timings at which the second device monitors sidelink control channel, (ii) to receive a SCI indicating a CSI report request from the second device, and (iii) to transmit, based on the one or more timings, a CSI report MAC CE to the second device at a second timing. Furthermore, the CPU 308 can execute the program code 312 to perform one, some and/or all of the above-described actions and steps and/or others described herein.

With respect to FIGS. 10-12, in one embodiment, the first device performs sidelink unicast communication with the second device.

In one embodiment, the first device performs sidelink groupcast communication with the second device.

In one embodiment, the sidelink control channel is PSCCH.

In one embodiment, the sidelink control channel is PSSCH.

In one embodiment, the sidelink control channel is PSFCH.

In one embodiment, the timer is an inactivity timer for DRX for sidelink.

Figure 13:
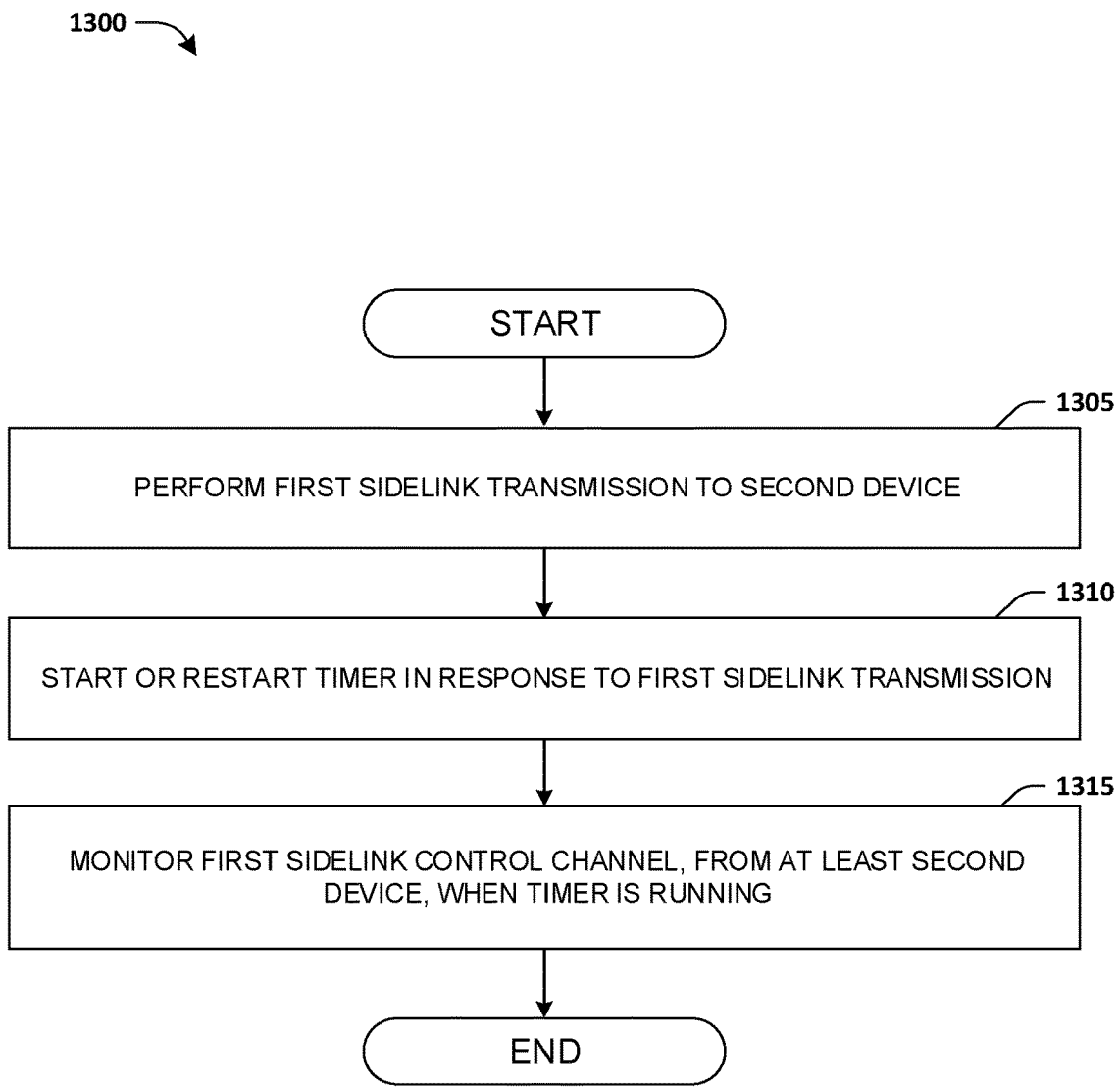
FIG. 13 is a flow chart according to one exemplary embodiment.

FIG. 13 is a flow chart 1300 according to one exemplary embodiment from the perspective of a first device configured to discontinuously monitor one or more sidelink control channels. In step 1305, the first device performs a first sidelink transmission to a second device. In step 1310, the first device starts or restarts a timer in response to the first sidelink transmission (e.g., in response to performing the first sidelink transmission). In step 1315, the first device monitors a first sidelink control channel, from at least the second device, when the timer is running. For example, the first sidelink control channel may be associated with one or more devices comprising the second device. The first device may monitor the first sidelink control channel based on the timer.

In one embodiment, the first sidelink transmission is a SCI transmission indicating a CSI report request.

In one embodiment, the first sidelink transmission comprises a SCI transmission and a sidelink data transmission.

In one embodiment, the first sidelink transmission indicates a CSI report request. The first device may start or restart the timer based on the first sidelink transmission indicating the CSI report request. For example, the first device starts or restarts the timer in response to the first sidelink transmission indicating the CSI report request (e.g., in response to performing the first sidelink transmission which indicates the CSI report request).

In one embodiment, the first sidelink transmission indicates a CSI report request. The first device may start or restart the timer in response to the CSI report request and/or the first sidelink transmission. The first device may start or restart the timer in response to the CSI report request indicated by the first sidelink transmission (e.g., in response to performing the first sidelink transmission which indicates the CSI report request). The first device may start or restart the timer based on the CSI report request indicated by the first sidelink transmission (e.g., based on performing the first sidelink transmission which indicates the CSI report request).

In one embodiment, the first device performs a second sidelink transmission to the second device, wherein the second sidelink transmission does not indicate a CSI report request. The first device does not start or restart the timer in response to the second sidelink transmission. For example, the first device may not start or restart the timer in response to the second sidelink transmission based on the second sidelink transmission not indicating a CSI report request.

In one embodiment, the first device stops the timer in response to receiving a CSI report MAC CE from the second device.

In one embodiment, the first device is in sidelink active time when the timer is running, wherein the first device monitors one or more sidelink control channels when the first device is in sidelink active time.

In one embodiment, the first sidelink transmission and/or a CSI report request indicated by the first sidelink transmission triggers the second device to transmit a CSI report MAC CE to the first device.

In one embodiment, the first sidelink control channel is monitored to receive (and/or acquire) one or more CSI reports from the second device.

In one embodiment, the second device triggers transmission of a CSI report MAC CE to the first device in response to the first sidelink transmission and/or the CSI report request (e.g., the second device may trigger transmission of the CSI Report MAC CE to the first device in response to receiving the first sidelink transmission and/or the CSI report request).

In one embodiment, the first device performs sidelink unicast communication with the second device.

In one embodiment, the sidelink control channel is PSCCH, PSSCH and/or PSFCH.

In one embodiment, the timer is an inactivity timer for DRX for sidelink.

In one embodiment, a time length of the timer is configured and/or pre-configured for a link between the first device and the second device. For example, the first device and/or the second device associated with the link may be configured with the time length. Alternatively and/or additionally, the time length of the timer may be specified (e.g., specified to the first device performing sidelink communication and/or to the second device performing sidelink communication). For example, the time length of the timer may be specified for the link between the first device and the second device.

In one embodiment, the time length of the timer may be based on a CSI report availability time (e.g., an availability time for CSI report). For example, the time length may be determined and/or set based on the CSI report availability time.

In one embodiment, the time length of the timer being based on the CSI report availability time prevents reception of an out of date CSI report. For example, the time length of the timer determined and/or set based on the CSI report availability time prevents reception of an out of date CSI report.

In one embodiment, the time length of the timer may be equal to or less than the CSI report availability time.

In one embodiment, the CSI report availability time is associated with (e.g., used for) preventing reception of an out of date CSI report (e.g., the CSI report availability time is used to set the time length of the timer to prevent reception of an out of date CSI report, such as a CSI report received after the timer expires).

In one embodiment, the CSI report availability time is configured and/or pre-configured for the link between the first device and the second device. For example, the first device and/or the second device associated with the link may be configured with the CSI report availability time. Alternatively and/or additionally, the CSI report availability time may be specified (e.g., specified to the first device performing sidelink communication and/or to the second device performing sidelink communication). For example, the CSI report availability time may be specified for the link between the first device and the second device.

Referring back to FIGS. 3 and 4, in one exemplary embodiment of a first device configured to discontinuously monitor one or more sidelink control channels, the device 300 includes a program code 312 stored in the memory 310. The CPU 308 could execute program code 312 to enable the first device (i) to perform a first sidelink transmission to a second device, (ii) to start or restart a timer in response to the first sidelink transmission (e.g., in response to performing the first sidelink transmission), and (iii) to monitor, when the timer is running, a first sidelink control channel from at least the second device. Furthermore, the CPU 308 can execute the program code 312 to perform one, some and/or all of the above-described actions and steps and/or others described herein.

Figure 14:
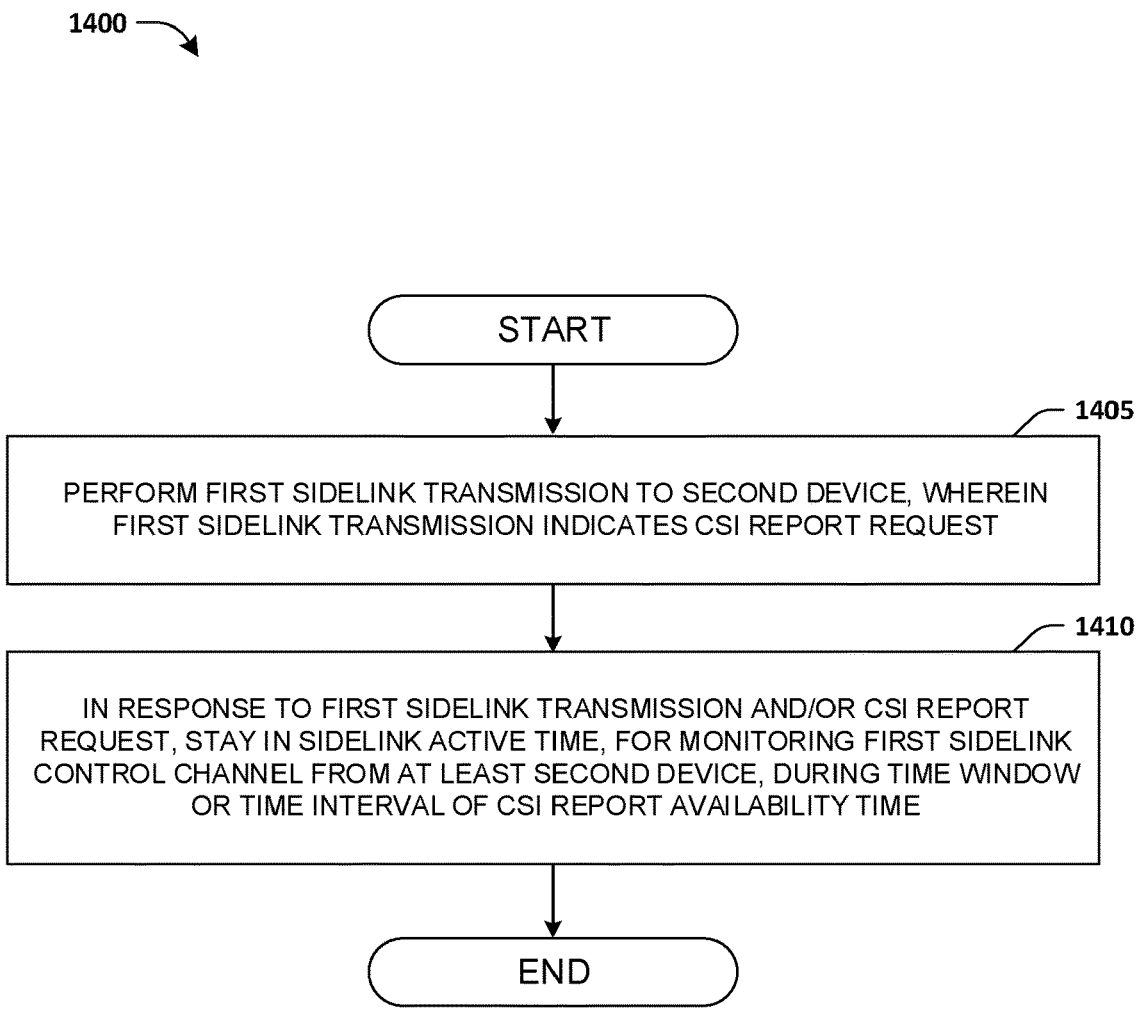
FIG. 14 is a flow chart according to one exemplary embodiment.

FIG. 14 is a flow chart 1400 according to one exemplary embodiment from the perspective of a first device configured to discontinuously monitor one or more sidelink control channels. In step 1405, the first device performs a first sidelink transmission to a second device, wherein the first sidelink transmission indicates a CSI report request (e.g., a request for a CSI report). In step 1410, in response to the first sidelink transmission and/or the CSI report request (e.g., in response to performing the first sidelink transmission indicating the CSI report request), the first device stays in sidelink active time (and/or keeps operating in sidelink active time and/or continues operating in sidelink active time), for monitoring a first sidelink control channel from at least the second device, during a time window or a time interval of a CSI report availability time (e.g., an availability time for CSI report). For example, the first device may be in sidelink active time and monitor the first sidelink control channel during the time window or the time interval. For example, the first device may enter sidelink active time and/or the first device may keep (and/or continue) being in sidelink active time during the time window or the time interval. In an example, the first device may be in sidelink active time when the first device performs the first sidelink transmission indicating the CSI report request, and, in response to performing the first sidelink transmission indicating the CSI report request, the first device may stay in sidelink active time (and/or may keep operating in sidelink active time and/or continue operating in sidelink active time), for monitoring the first sidelink control channel, during the time window or the time interval. The first sidelink control channel may be associated with one or more devices comprising the second device.

In one embodiment, the first device starts or restarts a timer in response to the first sidelink transmission and/or the CSI report request (e.g., in response to performing the first sidelink transmission indicating the CSI report request).

In one embodiment, the first device stops the timer in response to receiving a CSI report MAC CE from the second device.

In one embodiment, the first device is in sidelink active time when the timer is running, wherein the first device monitors one or more sidelink control channels when the first device is in sidelink active time.

In one embodiment, the first sidelink transmission and/or the CSI report request triggers the second device to transmit a CSI report MAC CE to the first device.

In one embodiment, the first sidelink control channel is monitored to receive (and/or acquire) one or more CSI reports from the second device.

In one embodiment, the second device triggers transmission of a CSI report MAC CE to the first device in response to the first sidelink transmission and/or the CSI report request (e.g., the second device may trigger transmission of the CSI Report MAC CE to the first device in response to receiving the first sidelink transmission and/or the CSI report request).

In one embodiment, the timer is an inactivity timer for DRX for sidelink.

In one embodiment, a time length of the timer is configured and/or pre-configured for a link between the first device and the second device. For example, the first device and/or the second device associated with the link may be configured with the time length. Alternatively and/or additionally, the time length of the timer may be specified (e.g., specified to the first device performing sidelink communication and/or to the second device performing sidelink communication). For example, the time length of the timer may be specified for the link between the first device and the second device.

In one embodiment, the time length of the timer may be based on the CSI report availability time. For example, the time length may be determined and/or set based on the CSI report availability time and/or a duration of the time window or the time interval.

In one embodiment, the time length of the timer being based on the CSI report availability time prevents reception of an out of date CSI report. For example, the time length (determined and/or set based on the CSI report availability time and/or the duration of the time window or the time interval) prevents reception of an out of data CSI report.

In one embodiment, the CSI report availability time is associated with (e.g., used for) preventing reception of an out of date CSI report (e.g., the CSI report availability time is used to set the time length of the timer to prevent reception of an out of date CSI report, such as a CSI report received after the timer expires).

In one embodiment, the CSI report availability time is configured and/or pre-configured for the link between the first device and the second device. For example, the first device and/or the second device associated with the link may be configured with the CSI report availability time. Alternatively and/or additionally, the CSI report availability time may be specified (e.g., specified to the first device performing sidelink communication and/or to the second device performing sidelink communication). For example, the CSI report availability time may be specified for the link between the first device and the second device.

In one embodiment, a duration of the time window or the time interval may be equal to or less than the CSI report availability time.

Referring back to FIGS. 3 and 4, in one exemplary embodiment of a first device configured to discontinuously monitor one or more sidelink control channels, the device 300 includes a program code 312 stored in the memory 310. The CPU 308 could execute program code 312 to enable the first device (i) to perform a first sidelink transmission to a second device, wherein the first sidelink transmission indicates a CSI report request (e.g., a request for a CSI report), and (ii) in response to the first sidelink transmission and/or the CSI report request (e.g., in response to performing the first sidelink transmission indicating the CSI report request), to stay in active time, for monitoring a first sidelink control channel from at least the second device, during a time window or a time interval of a CSI report availability time (e.g., an availability time for CSI report). Furthermore, the CPU 308 can execute the program code 312 to perform one, some and/or all of the above-described actions and steps and/or others described herein.

A communication device (e.g., a device, a sidelink device, a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 10-14. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 10-14, and/or one, some and/or all of the above-described actions and steps and/or others described herein.

It may be appreciated that applying one or more of the techniques presented herein may result in one or more benefits including, but not limited to, increased efficiency of communication between devices (e.g., a first device and a second device performing sidelink communication). The increased efficiency may be a result of avoiding data loss and resource waste by enabling the first device to monitor a sidelink control channel and receive a CSI report from the second device, even if a time at which the CSI report is transmitted by the second device is outside sidelink active time of a sidelink DRX configuration with which the first device is configured.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first device configured to discontinuously monitor one or more sidelink control channels, the method comprising:
performing a first sidelink transmission to a second device, wherein the first sidelink transmission indicates a channel state information (CSI) report request; and
responsive to at least one of the first sidelink transmission or the CSI report request, being in sidelink active time, for monitoring a first sidelink control channel from at least the second device, during a time between the first sidelink transmission and receiving a CSI report medium access control control element (MAC CE).

2. The method of claim 1, comprising:
starting or restarting a timer responsive to at least one of the first sidelink transmission or the CSI report request.

3. The method of claim 2, comprising:
stopping the timer responsive to receiving the CSI report MAC CE from the second device.

4. The method of claim 2, wherein:
the first device is in sidelink active time when the timer is running; and
the first device monitors one or more sidelink control channels when the first device is in sidelink active time.

5. The method of claim 1, wherein at least one of:
at least one of the first sidelink transmission or the CSI report request triggers the second device to transmit the CSI report MAC CE to the first device; or
monitoring the first sidelink control channel is performed to receive a CSI report from the second device.

6. The method of claim 2, wherein at least one of:
a time length of the timer is at least one of specified to the first device or configured for a link between the first device and the second device;
the timer is an inactivity timer for discontinuous reception (DRX) for sidelink; or
the time length of the timer is at least one of determined or set based on a CSI report availability time.

7. The method of claim 6, wherein at least one of:
the CSI report availability time is associated with preventing reception of an out of date CSI report; or
the CSI report availability time is at least one of specified to the first device or configured for a link between the first device and the second device.

8. The method of claim 1, wherein the first device stops being in active time when a CSI report associated with the CSI report request is received.

9. A first device configured to discontinuously monitor one or more sidelink control channels, the first device comprising:
a control circuit;
a processor installed in the control circuit; and
a memory installed in the control circuit and operatively coupled to the processor, wherein the processor is configured to execute a program code stored in the memory to perform operations, the operations comprising:
performing a first sidelink transmission to a second device, wherein the first sidelink transmission indicates a channel state information (CSI) report request; and
responsive to at least one of the first sidelink transmission or the CSI report request, being in sidelink active time, for monitoring a first sidelink control channel from at least the second device, during a time between the first sidelink transmission and receiving a CSI report medium access control control element (MAC CE).

10. A method of a first device configured to discontinuously monitor one or more sidelink control channels, the method comprising:
performing a first sidelink transmission to a second device, wherein the first sidelink transmission indicates a channel state information (CSI) report request;
responsive to at least one of the first sidelink transmission or the CSI report request, being in sidelink active time, for monitoring a first sidelink control channel from at least the second device, during a time interval of a CSI report availability time; and
stopping being in active time in response to a CSI report associated with the CSI report request being received.

11. The method of claim 10, comprising:
starting or restarting a timer responsive to at least one of the first sidelink transmission or the CSI report request.

12. The method of claim 11, comprising:
stopping the timer responsive to receiving a CSI report medium access control control element (MAC CE) from the second device.

13. The method of claim 11, wherein:
the first device is in sidelink active time when the timer is running; and
the first device monitors one or more sidelink control channels when the first device is in sidelink active time.

14. The method of claim 10, wherein at least one of:
at least one of the first sidelink transmission or the CSI report request triggers the second device to transmit a CSI report medium access control control element (MAC CE) to the first device; or
monitoring the first sidelink control channel is performed to receive a CSI report from the second device.

15. The method of claim 11, wherein at least one of:
a time length of the timer is at least one of specified to the first device or configured for a link between the first device and the second device;
the timer is an inactivity timer for discontinuous reception (DRX) for sidelink; or the time length of the timer is at least one of determined or set based on the CSI report availability time.

16. The method of claim 10, wherein at least one of:
the CSI report availability time is associated with preventing reception of an out of date CSI report; or
the CSI report availability time is at least one of specified to the first device or configured for a link between the first device and the second device.

* * * * *